(12) United States Patent
Kumar et al.

(10) Patent No.: US 11,645,261 B2
(45) Date of Patent: May 9, 2023

(54) SYSTEM AND METHOD FOR HETEROGENEOUS DATABASE REPLICATION FROM A REMOTE SERVER

(71) Applicant: ORACLE INTERNATIONAL CORPORATION, Redwood Shores, CA (US)

(72) Inventors: Ashish Kumar, Bengaluru (IN); Avinash Dubey, Bengaluru (IN); Vinay Sachdev, Bengaluru (IN); Scott Roger Corbin, Spooner, WI (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 113 days.

(21) Appl. No.: 16/394,876

(22) Filed: Apr. 25, 2019

(65) Prior Publication Data

US 2019/0332582 A1    Oct. 31, 2019

Related U.S. Application Data

(60) Provisional application No. 62/663,954, filed on Apr. 27, 2018.

(51) Int. Cl.
   G06F 16/27    (2019.01)
   G06F 16/23    (2019.01)
   H04L 67/1095  (2022.01)

(52) U.S. Cl.
   CPC ........ G06F 16/2358 (2019.01); G06F 16/273 (2019.01); H04L 67/1095 (2013.01)

(58) Field of Classification Search
   CPC . G06F 16/2358; G06F 16/273; H04L 67/1095
   See application file for complete search history.

(56) References Cited

U.S. PATENT DOCUMENTS

| | | |
|---|---|---|
| 6,016,501 A | 1/2000 | Martin |
| 6,173,388 B1 | 1/2001 | Abercrombie |
| | (Continued) | |

FOREIGN PATENT DOCUMENTS

| | | |
|---|---|---|
| CN | 101615199 | 12/2009 |
| CN | 101719165 | 6/2010 |
| | (Continued) | |

OTHER PUBLICATIONS

"Creating a DB Cluster and Connecting to a Database on an Amazon Aurora DB Instance", retrieved Apr. 24, 2018, from https://docs.aws.amazon.com/, 2018, 9 pages.

(Continued)

*Primary Examiner* — Grace Park
(74) *Attorney, Agent, or Firm* — Tucker Ellis LLP

(57) ABSTRACT

In accordance with an embodiment, described herein is a system and method for heterogeneous database replication from a remote server, for example a remote database server. A capture process can be registered as a replication slave to the remote server, and configured to receive transaction event data from that server. Transaction log events associated with a modification to the database at the remote server can be processed, and output as change data, in a canonical format output, for use with one or more heterogeneous targets, for example a target database server or message queue. The process enables capture of transaction log events associated with database transactions at a remote server that may be located on a different computer or network, or within an access-restricted environment such as a cloud environment, without the need to create additional copies of its transaction logs.

20 Claims, 16 Drawing Sheets

(56) References Cited

U.S. PATENT DOCUMENTS

| | | | |
|---|---|---|---|
| 6,212,628 B1 | 4/2001 | Abercrombie | |
| 6,615,223 B1* | 9/2003 | Shih | G06F 16/27 |
| | | | 707/625 |
| 6,687,848 B1 | 2/2004 | Najmi | |
| 6,753,889 B1 | 6/2004 | Najmi | |
| 6,877,023 B1 | 4/2005 | Maffeis | |
| 7,031,987 B2 | 4/2006 | Mukkamalla | |
| 7,039,773 B2 | 5/2006 | Hu | |
| 7,076,508 B2 | 7/2006 | Bourbonnais | |
| 7,254,586 B2 | 8/2007 | Chen | |
| 7,257,690 B1 | 8/2007 | Baird | |
| 7,299,230 B2 | 11/2007 | Liou | |
| 7,310,716 B2 | 12/2007 | Galipeau | |
| 7,321,939 B1 | 1/2008 | Porter | |
| 7,360,111 B2 | 4/2008 | Adya | |
| 7,571,173 B2 | 8/2009 | Yang | |
| 7,702,698 B1* | 4/2010 | Chakravarthy | G06F 16/273 |
| | | | 707/804 |
| 7,716,181 B2 | 5/2010 | Todd | |
| 7,730,107 B1 | 6/2010 | Shultz | |
| 7,831,574 B2 | 11/2010 | Pareek | |
| 7,873,635 B2 | 1/2011 | Wang | |
| 7,885,922 B2 | 2/2011 | Pareek | |
| 8,161,468 B2 | 4/2012 | Todd | |
| 8,224,834 B2 | 4/2012 | Akaboshi | |
| 8,296,269 B2 | 10/2012 | Pareek | |
| 8,402,358 B2 | 3/2013 | Knauft | |
| 8,510,270 B2 | 8/2013 | Pareek | |
| 8,538,886 B1 | 9/2013 | Iu | |
| 8,626,778 B2 | 1/2014 | Wilkes | |
| 8,650,155 B2 | 2/2014 | Corbin | |
| 8,666,939 B2 | 3/2014 | O'Krafka | |
| 9,047,392 B2 | 6/2015 | Wilkes | |
| 9,130,988 B2 | 9/2015 | Seifert | |
| 9,298,878 B2 | 3/2016 | Guirguis | |
| 9,442,995 B2 | 9/2016 | Pareek | |
| 9,592,448 B2 | 3/2017 | Danilak | |
| 9,818,043 B2 | 11/2017 | Sala | |
| 9,904,717 B2 | 2/2018 | Anglin | |
| 10,032,244 B2 | 7/2018 | Manevitch | |
| 10,331,695 B1* | 6/2019 | Stickle | G06F 16/27 |
| 10,331,753 B1 | 6/2019 | Zhang | |
| RE48,243 E | 10/2020 | Pareek | |
| 2002/0123987 A1 | 9/2002 | Cox | |
| 2002/0169842 A1 | 11/2002 | Christensen | |
| 2002/0174340 A1 | 11/2002 | Dick | |
| 2003/0131027 A1* | 7/2003 | Holenstein | G06F 16/273 |
| 2004/0148585 A1 | 7/2004 | Sengodan | |
| 2004/0254919 A1 | 12/2004 | Giuseppini | |
| 2005/0102264 A1 | 5/2005 | Nason | |
| 2005/0114285 A1 | 5/2005 | Cincottta | |
| 2005/0165858 A1 | 7/2005 | Tom | |
| 2005/0253739 A1 | 11/2005 | Hu | |
| 2006/0041540 A1 | 2/2006 | Shannon | |
| 2006/0212356 A1 | 9/2006 | Lambert | |
| 2006/0235715 A1 | 10/2006 | Abrams | |
| 2007/0044069 A1 | 2/2007 | Doucette | |
| 2007/0226263 A1 | 9/2007 | Liou | |
| 2007/0288458 A1 | 12/2007 | Kacmarcik | |
| 2007/0299885 A1 | 12/2007 | Pareek | |
| 2008/0027987 A1 | 1/2008 | Arora et al. | |
| 2008/0077601 A1 | 3/2008 | Liou | |
| 2009/0106327 A1 | 4/2009 | Dilman | |
| 2009/0313311 A1 | 12/2009 | Hoffman | |
| 2010/0042583 A1 | 2/2010 | Gervais | |
| 2010/0191884 A1 | 7/2010 | Holenstein | |
| 2010/0205123 A1 | 8/2010 | Sculley | |
| 2010/0205151 A1 | 8/2010 | Kuroide | |
| 2010/0274768 A1 | 10/2010 | Wang | |
| 2010/0274788 A1 | 10/2010 | Coker | |
| 2011/0029681 A1 | 2/2011 | Lee | |
| 2011/0179011 A1 | 7/2011 | Cardno | |
| 2011/0229681 A1 | 9/2011 | Sakamoto | |
| 2011/0307524 A1 | 12/2011 | Aitken | |
| 2012/0023116 A1 | 1/2012 | Wilkes | |
| 2012/0030165 A1 | 2/2012 | Guirguis | |
| 2012/0030172 A1* | 2/2012 | Pareek | G06F 16/10 |
| | | | 707/635 |
| 2012/0137276 A1 | 5/2012 | Todd | |
| 2012/0295716 A1 | 11/2012 | Lee | |
| 2012/0303559 A1 | 11/2012 | Dolan | |
| 2013/0054524 A1 | 2/2013 | Anglin | |
| 2013/0246376 A1 | 9/2013 | Padmanabhan | |
| 2013/0318044 A1 | 11/2013 | Pareek | |
| 2014/0172886 A1 | 6/2014 | Wilkes | |
| 2014/0280356 A1 | 9/2014 | Danilak | |
| 2016/0055611 A1 | 2/2016 | Manevitch | |
| 2016/0085982 A1 | 3/2016 | Guirguis | |
| 2016/0379083 A1 | 12/2016 | Sala | |
| 2017/0322993 A1* | 11/2017 | Brodt | G06F 16/2358 |
| 2018/0081924 A1 | 3/2018 | Johnston | |
| 2018/0150501 A1* | 5/2018 | Hattori | G06F 16/275 |
| 2019/0102418 A1 | 4/2019 | Vasudevan | |
| 2020/0117680 A1* | 4/2020 | Bapat | G06F 9/546 |

FOREIGN PATENT DOCUMENTS

| | | |
|---|---|---|
| JP | 563-14390 | 1/1988 |
| JP | 2000082070 | 3/2000 |
| JP | 2004341926 | 12/2004 |
| JP | 2005293323 | 10/2005 |
| JP | 2007114817 | 5/2007 |
| JP | 2013535737 | 9/2013 |
| WO | 2007134250 | 11/2007 |

OTHER PUBLICATIONS

International Search Report and the Written Opinion of the International Searching Authority dated Jun. 28, 2019 for PCT Application No. PCT/US2019/029423, 12 pages.

"MySQL 5.7 Reference Manual: 4.6 7 mysqlbinlog—Utility for Processing Binary Log Files", retrieved Apr. 24, 2018 from https://dev.mysql.com/doc/refman/5.7/en/mysqlbinlog.html, 2018, Oracle Corporation, 19 pages.

"MySQL Server", retrieved on Apr. 24, 2018 from https://github.com/mysql/mysql-server, 2 pages.

Soorma, Gavin; "GoldenGate Tutorial 1 Concepts and Architecture", retrieved from http://gavinsooram.com/2010/02/goldengate-concepts-and-architecture/ on Jan. 30, 2013, 4 pages.

Intellectual Property India, Examination report under sections 12 & 13 of the Patents Act, 1970 and the Patents Rules, 2003, dated Aug. 15, 2021 for Indian Application No. 202047001965, 7 pages.

Japanese Patent Office, Notice of Reasons for Refusal, dated Sep. 7, 2021 for Japanese Patent Application No. 2020-525921, 10 pages.

Katsumi Kumakura, "Development of Distributed Database by Way of Replication", SQL Server magazine, Japan, Shoeisha Co.,Ltd., Feb. 15, 2004, No. 13, pp. 58-66.

Fred Louis, "Oracle Golden Gate: Architecture for Real-Time Replication" Jan. 2010, 69 Pages.

Oracle®, Oracle Goldengate Administration Guide Version 10.4, Oct. 2009, 59 Pages.

Oracle®, Oracle Technology Overview, Copyright © 2010 Oracle V5.0.2, Jun. 2010, 30 Pages.

Oracle®, MYSQL™ 5.0 Reference Manual Archived Version From Apr. 1, 2010, Jan. 4, 2010, 3 Pages.

Gavin Soorma, Oracle®, Oracle Goldengate Tutorial 1—Concepts and Architecture, Feb. 8, 2010, 4 Pages.

Oracle®, Oracle Data Sheet, Oracle Goldengate, Copyright Copyright © 2008, 2009, 4 Pages.

Alex Blyth, Oracle®, Oracle Goldengate—An Overview, Jul. 2010, 58 Pages.

Shenoda Guirguis et al., "Bronzegate: Real-Time Transactional Data Obfuscation for Goldengate", Jan. 2010, 6 Pages.

Katsumi Kumakura, "Development of Distributed Database by Way of Replication", SQL Server magazine, Japan, Shoeisha Co.,Ltd., Feb. 15, 2004, No. 13, Partial Translation—English translation of p. 60 only.

Chaudhry, Imran, "DSE Advanced Replication in DSE 5.1", published Jul. 11, 2017, https://www.datastax.com/dev/blog/advanced-replication-in-dse-5-1, 11 pages.

(56) References Cited

OTHER PUBLICATIONS

"DirXML 1.0 Administration Guide: Removing the Boundaries for E-Business", Novell, Inc., Nov. 2000, 104 pages.
Oracle®, "Oracle Fusion Middleware: Using Oracle GoldenGate for Big Data", Release 12.3.2.1, May 2018, 335 pages.
Oracle®, Oracle Help Center, "Fusion Middleware Using Oracle GoldenGate for Big Data: 17 Using Oracle GoldenGate Capture for Cassandra", 27 pages.
Vajda, Vladimir, "Cassandra to Kafka Data Pipeline (Part 1)", published Aug. 12, 2017, <https://dzone.com/articles/cassandra-to-kafka-data-pipeline-part-1>, 11 pages.
Vajda, Vladimir, "Cassandra to Kafka Data Pipeline (Part 2)", published Nov. 20, 2017, <https://dzone.com/articles/cassandra-to-kafka-data-pipeline-part-2>, 7 pages.
European Patent Office, extended European search report dated Aug. 21, 2018 For European Patent Application No. 18182168.7, 10 pages.
European Patent Office, Notification of Transmittal of the International Search Report and the Written Opinion of the International Searching Authority, or the Declaration dated Dec. 13, 2018 for International Application No. PCT/US/2018/053441, 10 pages.
European Patent Office, Notification of Transmittal of the International Search Report and the Written Opinion of the International Searching Authority, or the Declaration dated Feb. 18, 2013 for International Application No. PCT/US/2011/036508, 10 pages.
United States Patent and Trademark Office, Notice of Allowance and Fee(s) Due dated Jul. 9, 2020 for U.S. Appl. No. 15/881,432, 12 pages.
United States Patent and Trademark Office, Notice of Allowance and Fee(S) Due dated Oct. 28, 2022 for U.S. Appl. No. 16/145,707, 14 pages.
China National Intellectual Property Administration, Notification of the First Office Action dated Oct. 21, 2022 for Chinese Patent Application No. 201880007751.2, 9 pages.
United States Patent and Trademark Office, Office Communication dated May 12, 2022 for U.S. Appl. No. 16/145,707, 23 pages.
European Patent Office, Communication pursuant to Article 94(3) EPC dated Dec. 9, 2021 for European Patent Application No. 18788970.4, 6 pages.
Japanese Patent Office, Decision of Refusal dated Nov. 15, 2021 for Japanese Patent Application No. 2020-500202, 22 pages.
United States Patent and Trademark Office, Office Communication dated Oct. 4, 2021 for U.S. Appl. No. 16/145,707, 25 pages.
United States Patent and Trademark Office, Office Communication dated Jan. 1, 2021 for U.S. Appl. No. 16/145,707, 17 pages.
United States Patent and Trademark Office, Office Communication dated Jun. 2, 2020 for U.S. Appl. No. 16/145,707, 16 pages.
European Patent Office, Communication pursuant to Article 94(3) EPC dated Jul. 20, 2022 for European Patent Application No. 19722463.7, 7 pages.

\* cited by examiner

SYSTEM AND METHOD FOR HETEROGENEOUS DATABASE REPLICATION FROM A REMOTE SERVER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY AND CROSS-REFERENCE TO RELATED APPLICATIONS

This application claims the benefit of priority to U.S. Provisional Patent Application titled "SYSTEM AND METHOD FOR HETEROGENOUS DATABASE REPLICATION FROM A REMOTE SERVER", Application No. 62/663,954, filed Apr. 27, 2018; and is related to U.S. Pat. No. 8,510,270, titled "MYSQL DATABASE HETEROGENEOUS LOG BASED REPLICATION", issued Aug. 13, 2013; each of which above applications and patents are herein incorporated by reference.

TECHNICAL FIELD

Embodiments described herein are generally related to change data capture environments, and are particularly related to a system and method for heterogeneous database replication from a remote server, for example a remote database server.

BACKGROUND

Organizations may at times need to move, copy, or otherwise replicate data between different database environments, for example to create a backup of a database, or to enable sharing of the data between different database applications.

Change data capture systems help address this need, for example by detecting and replicating changes to the data, such as might be made to a database table as a result of database transactions such as row operations, rather than copying the entire table and its data. Such an approach can be used, for example, to synchronize data in a source database with that in a target database.

In some data replication environments, a change data capture system can operate by reading a record of database transactions from transaction log files, and using that in replicating data, or modifications to a database, between source and target servers.

However, such an approach generally requires the capture process to know the location of, and be able to directly access, the transaction log files stored locally. If, for example, a source database server is running on a different computer from the capture process, or on a different network, or within an access-restricted environment such as a cloud environment, then the capture process may not be able to access its transaction log files.

The lack of a remote transaction processing ability restricts the use of change data capture or data replication in such environments.

SUMMARY

In accordance with an embodiment, described herein is a system and method for heterogeneous database replication from a remote server, for example a remote database server. A capture process can be registered as a replication slave to the remote server, and configured to receive transaction event data from that server. Transaction log events associated with a modification to the database at the remote server can be processed, and output as change data, in a canonical format output, for use with one or more heterogeneous targets, for example a target database server or message queue.

A technical purpose of the systems and methods described herein includes that the process enables capture of transaction log events associated with database transactions at a remote server that may be located on a different computer or network, or within an access-restricted environment such as a cloud environment, without the need to create additional copies of its transaction logs.

Advantages of the systems and methods described herein include that the capture process does not require local access to the transaction log, but can instead access transaction logs at a different computer from the capture process, or on a different network, or within an access-restricted environment such as a cloud environment.

Further advantages of the systems and methods described herein include support for replication of transaction log data between heterogeneous servers, i.e., servers of different types; for example between a remote server of a first type, and a second type of target server; by use of a canonical format output and forming commands or queries according to each particular target, and applying those commands or queries to that target.

Additional advantages of the systems and methods described herein include enabling communication of transaction log events associated with a modification to the database at a remote server communication without the need to operate with a native application program interface (API) at that remote server.

Further advantages of the systems and methods described herein include that the capture process can be configured to operate a process or algorithm for determining a log positioning information, for example according to time or index, that enables operation with the remote server; so that once this command is successfully returned, the server can start sending the transaction log data, beginning from the start position.

BRIEF DESCRIPTION OF THE DRAWINCIS

Figure 4:
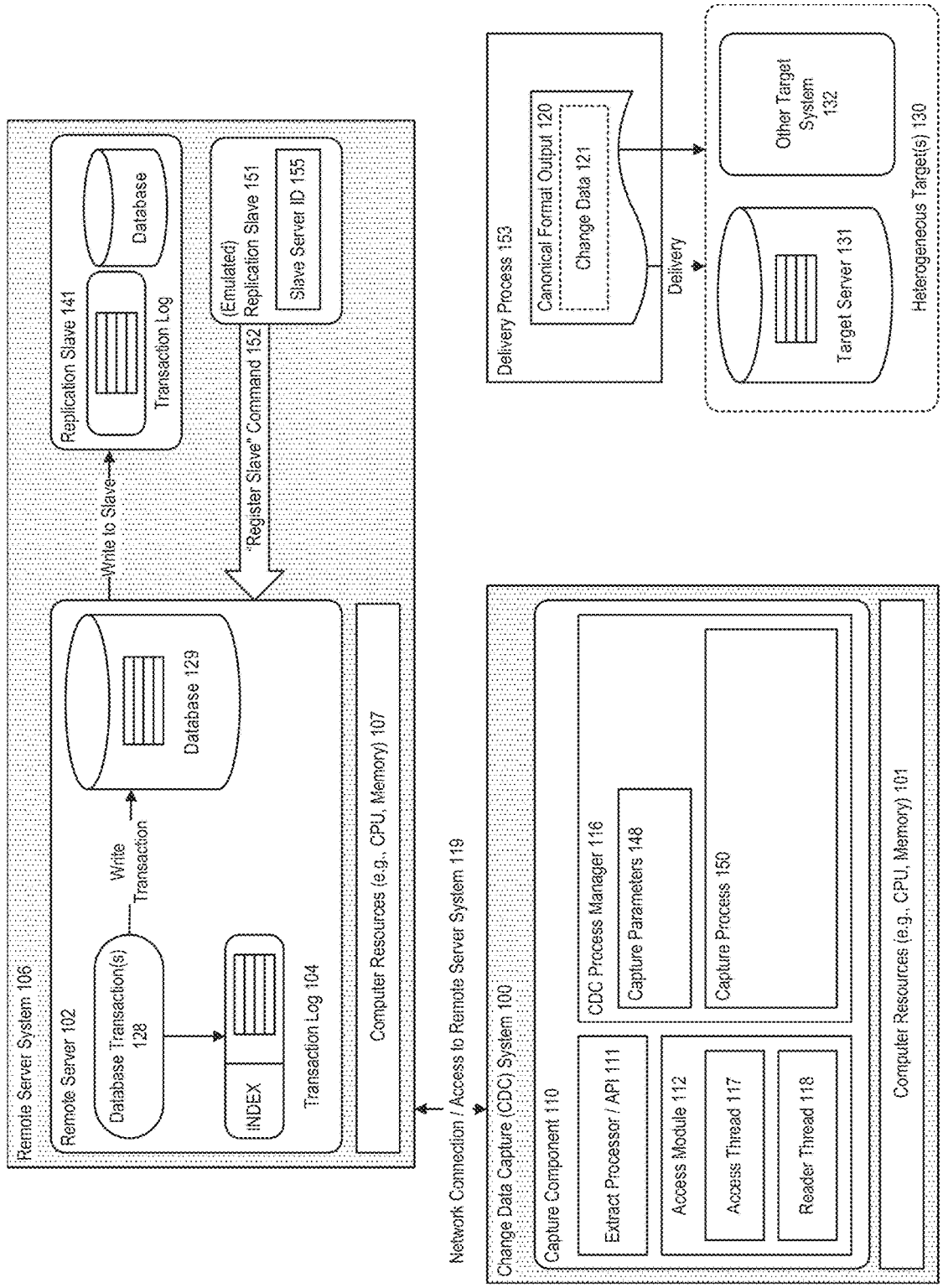

FIG. 4 further illustrates the use of a change data capture system to enable heterogeneous database replication from a remote server, in accordance with an embodiment.

Figure 5:
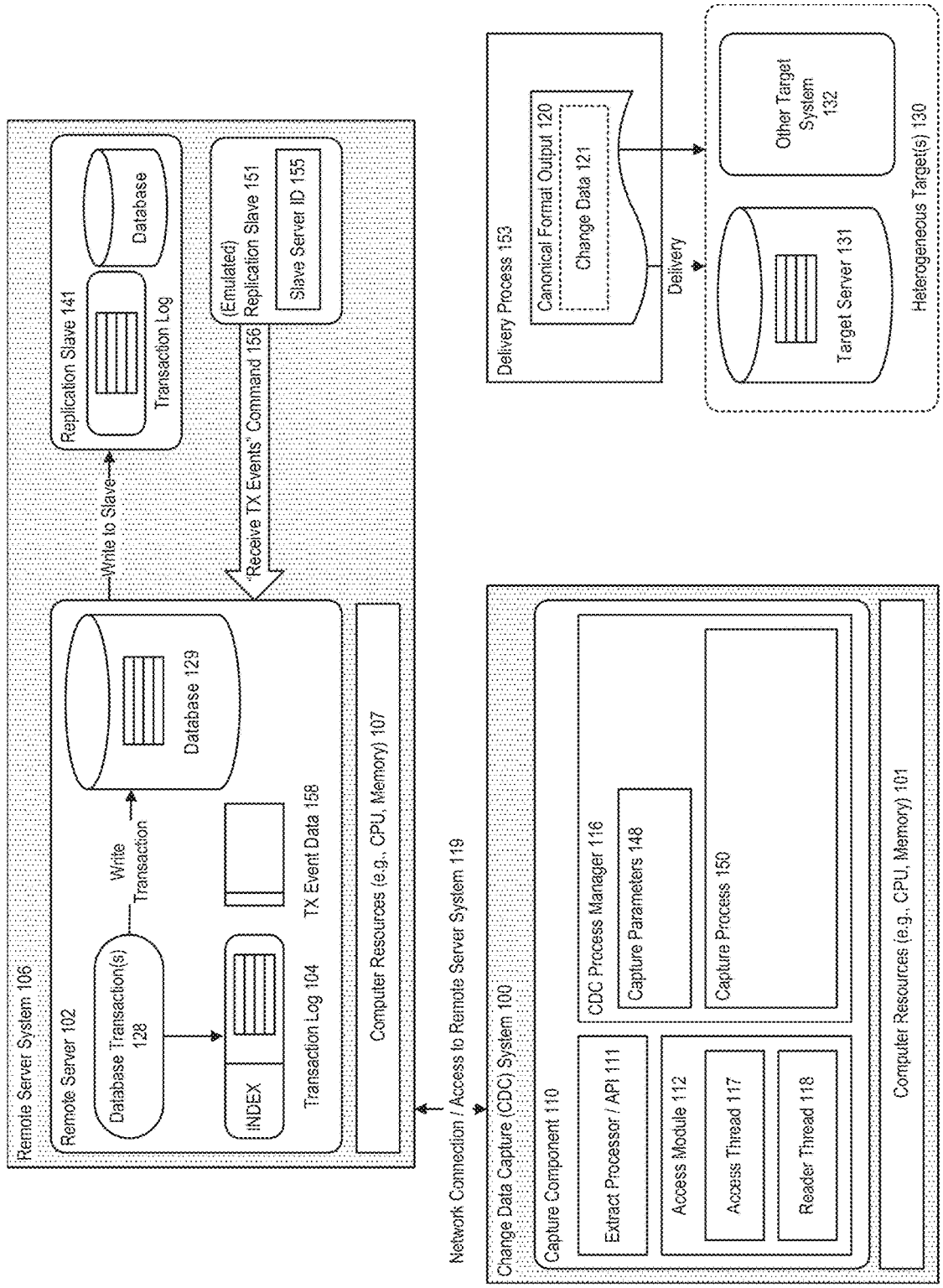

FIG. 5 further illustrates the use of a change data capture system to enable heterogeneous database replication from a remote server, in accordance with an embodiment.

Figure 6:
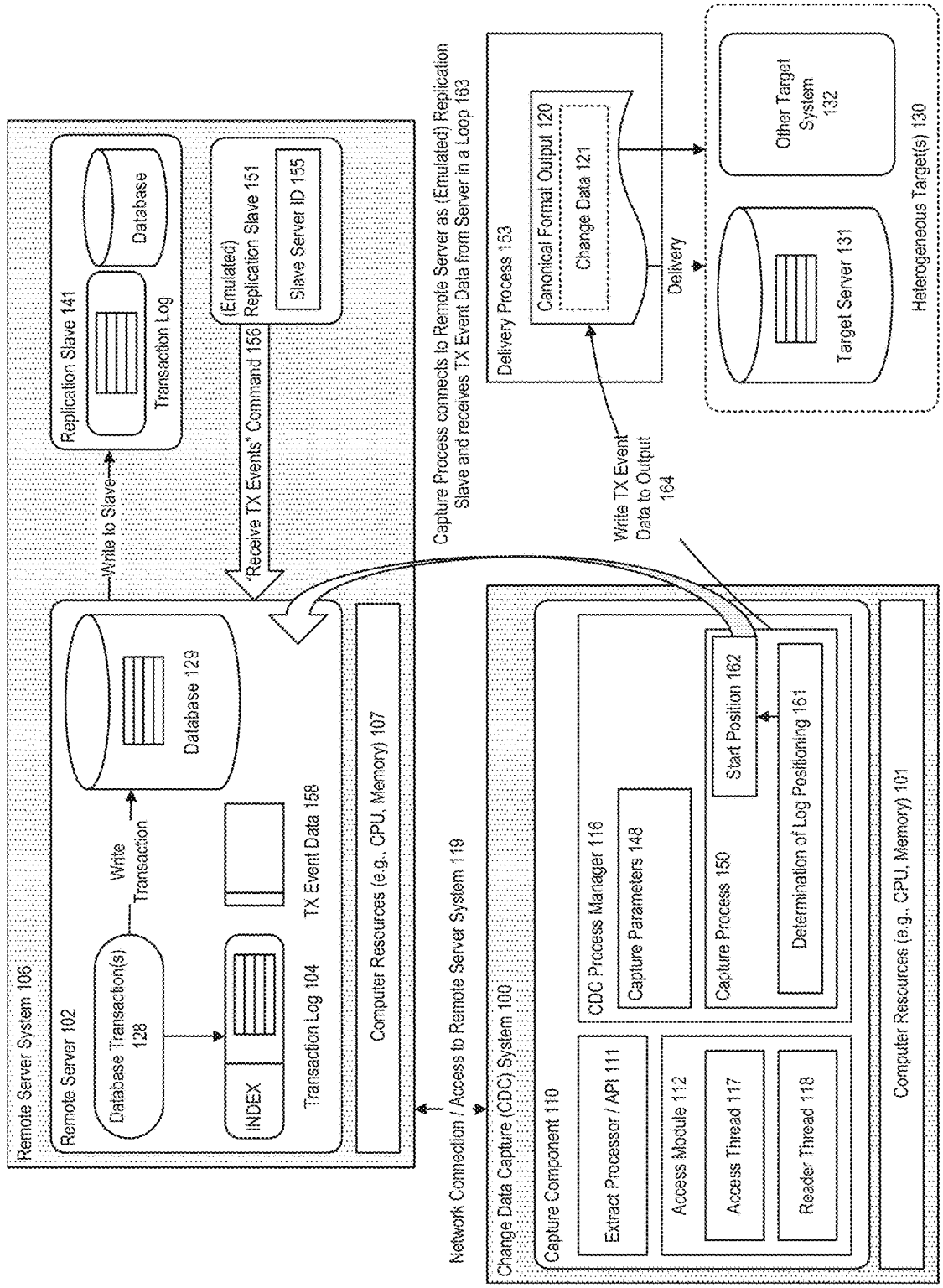

FIG. 6 further illustrates the use of a change data capture system to enable heterogeneous database replication from a remote server, in accordance with an embodiment.

Figure 7:
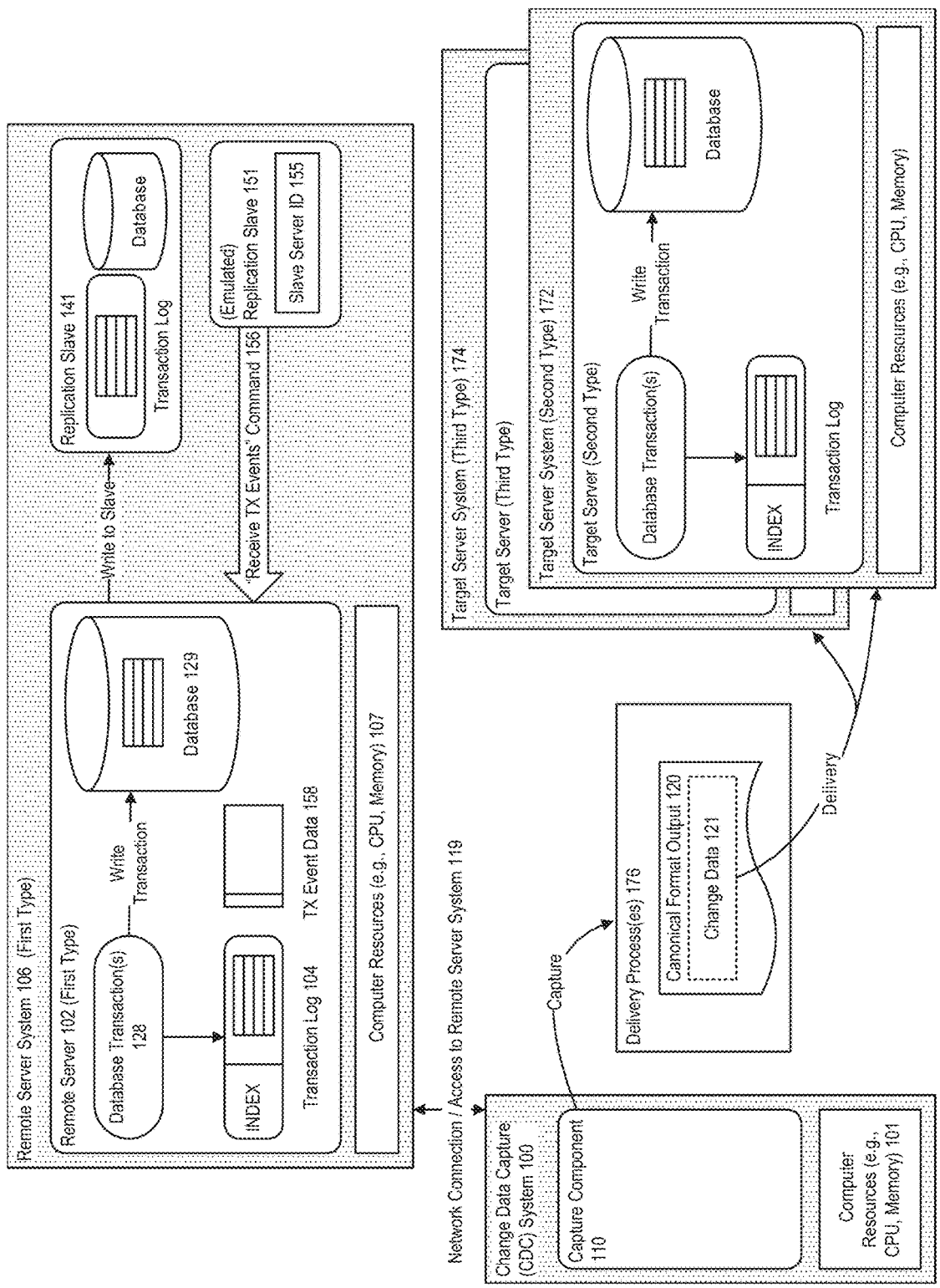

FIG. 7 illustrates how the change data capture system provides a canonical format output that enables heterogeneous database replication between servers of different types.

Figure 8:
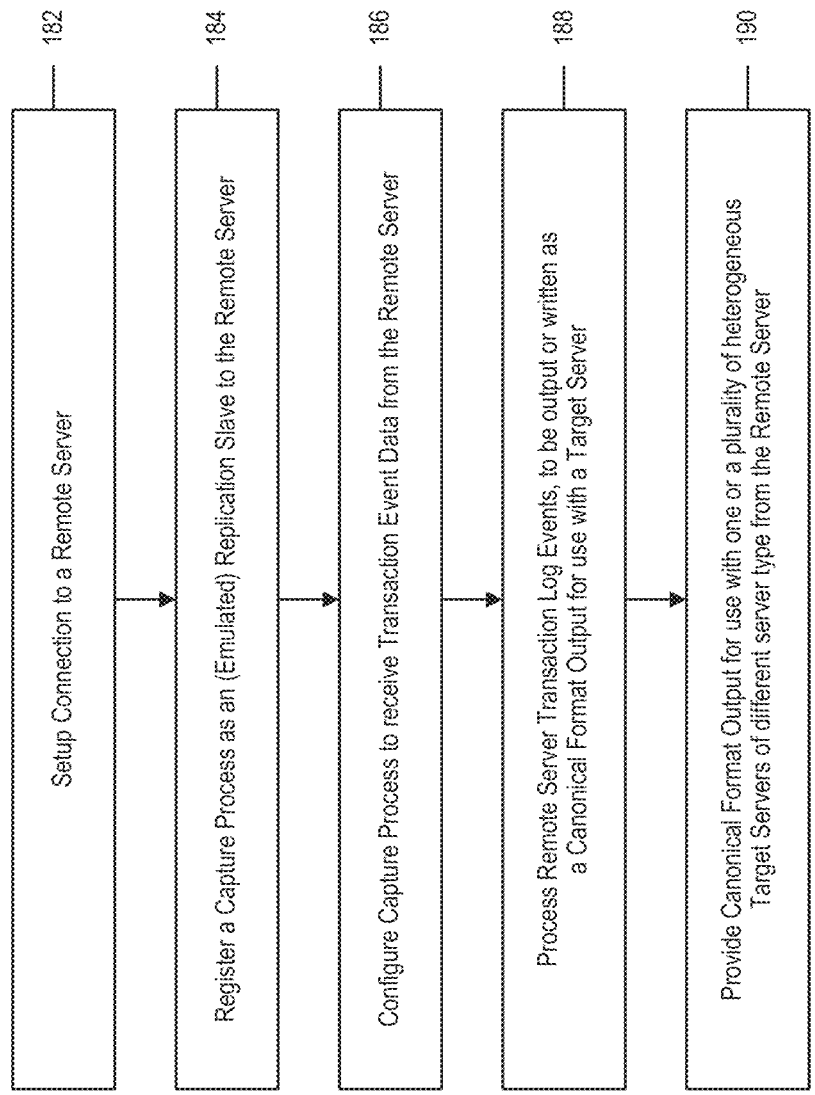

FIG. 8 illustrates a process for providing heterogeneous database replication from a remote server, in accordance with an embodiment.

Figure 9:
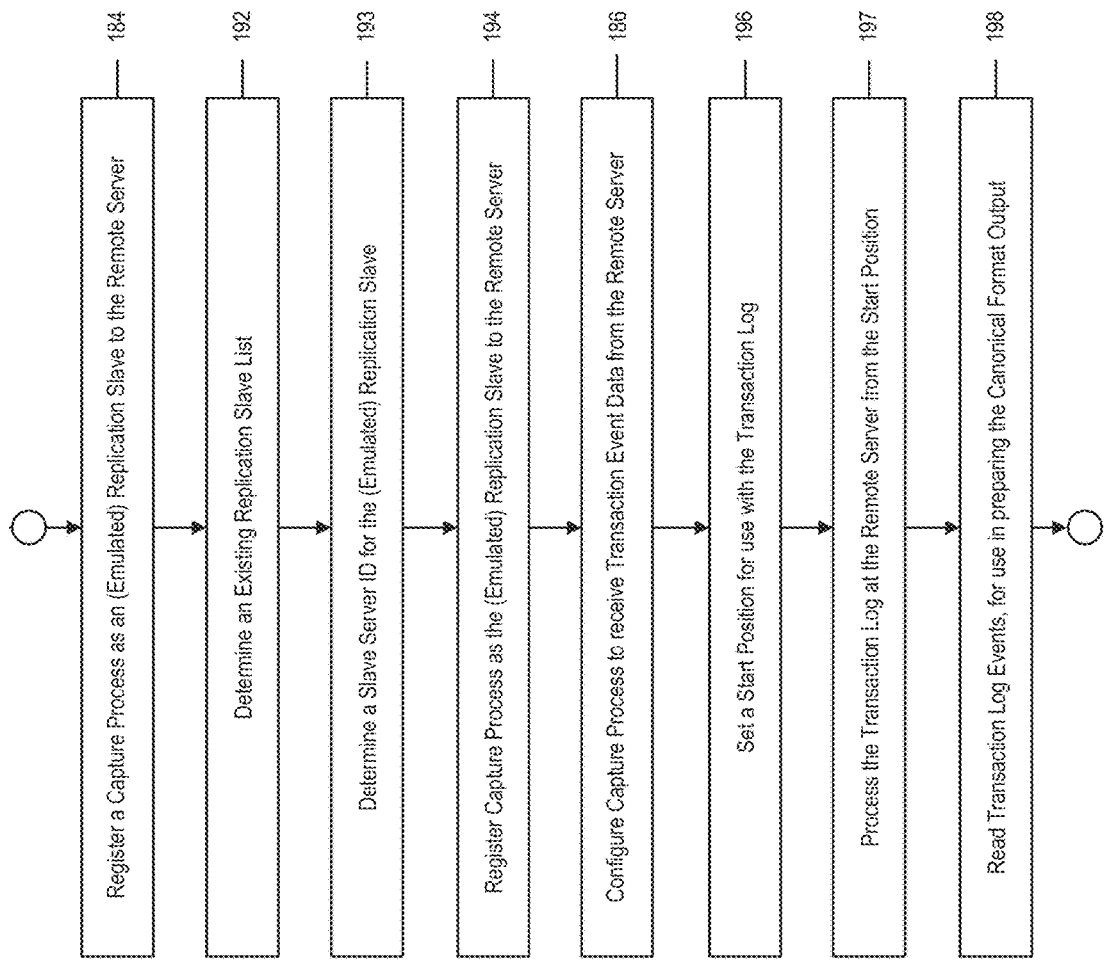

FIG. 9 further illustrates a process for providing heterogeneous database replication from a remote server, in accordance with an embodiment.

Figure 10:
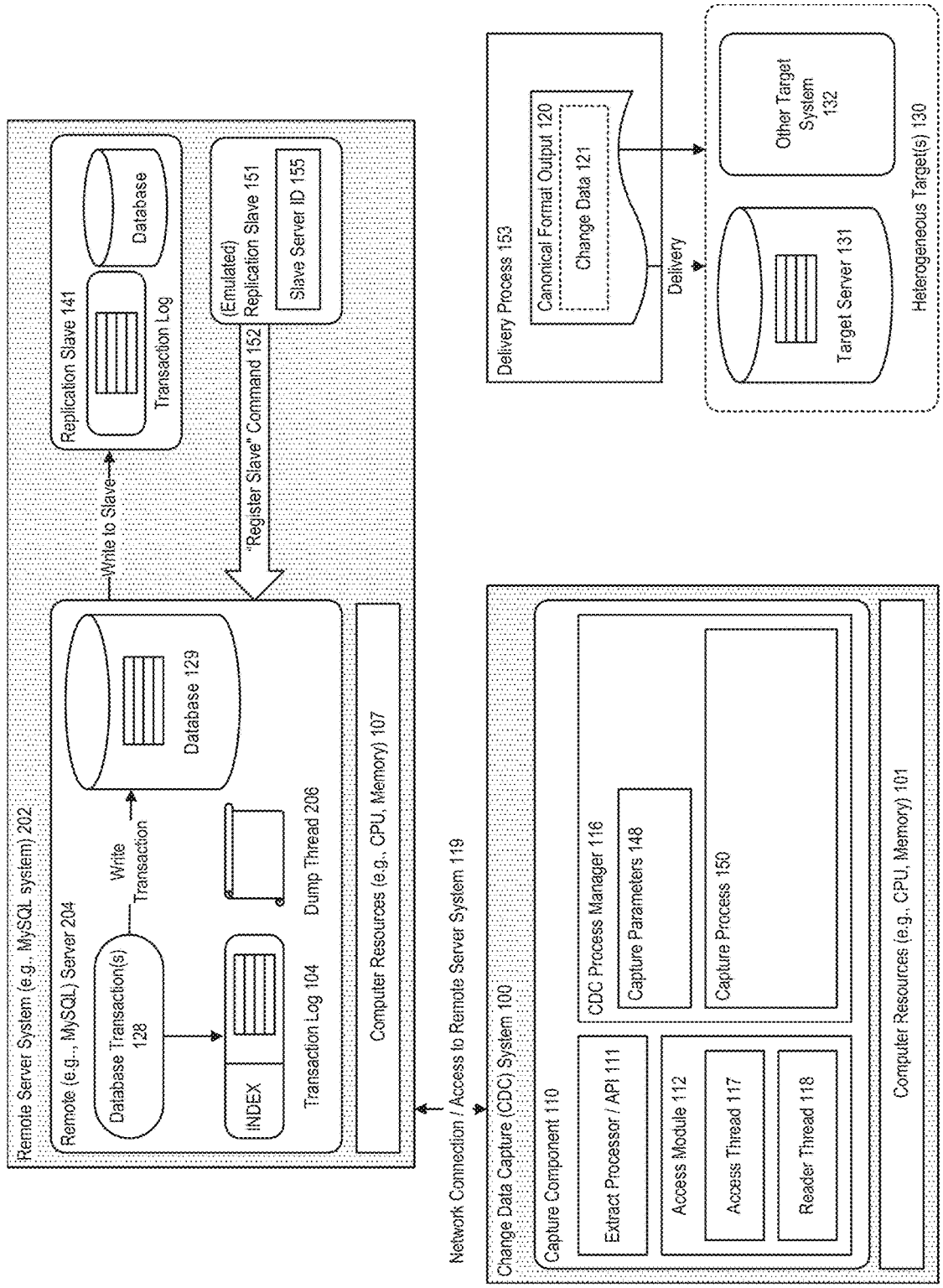

FIG. 10 illustrates an example of a change data capture system with a remote server that uses dump threads, in accordance with an embodiment.

Figure 11:
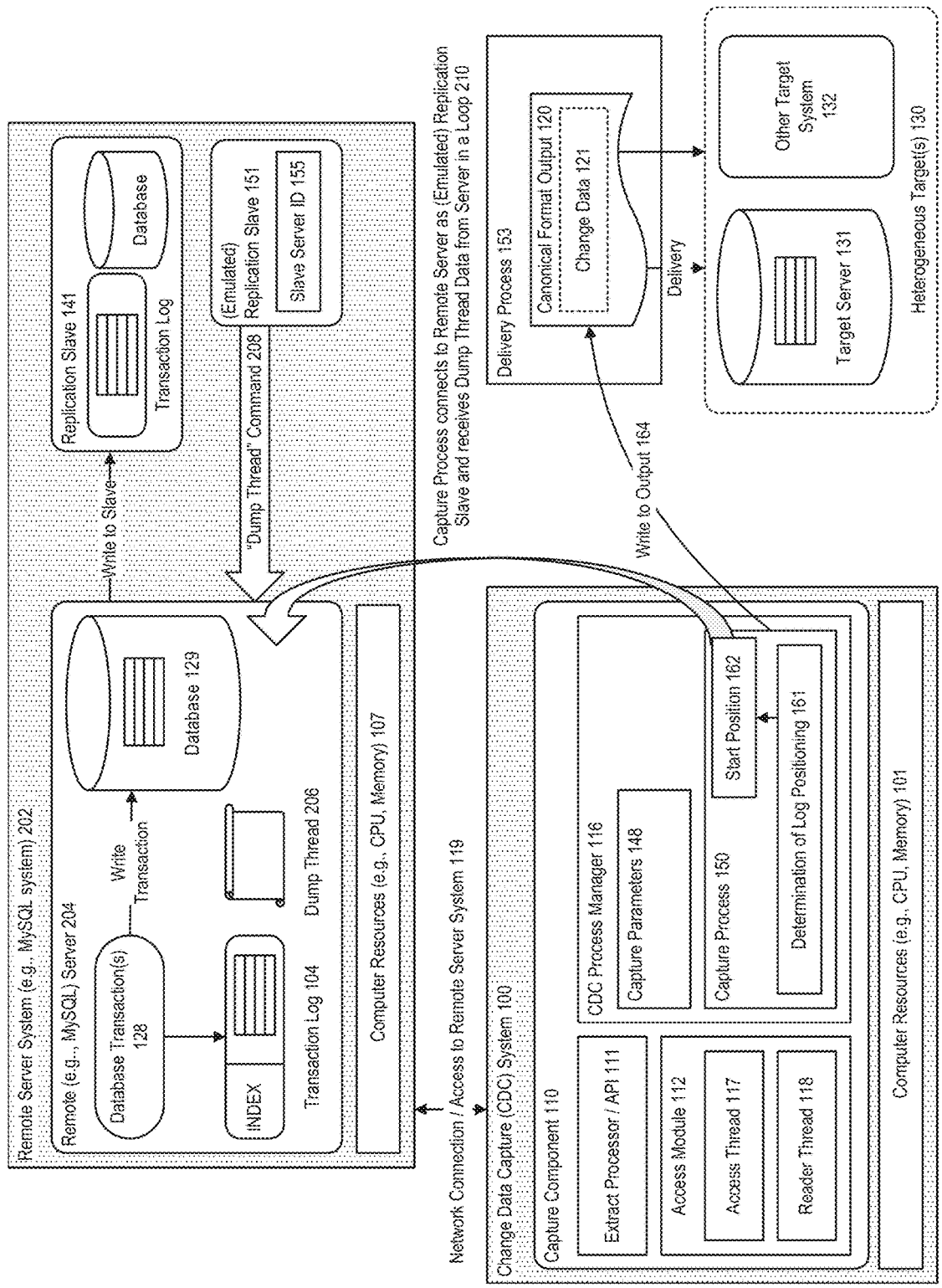

FIG. 11 further illustrates an example of a change data capture system with a remote server that uses dump threads, in accordance with an embodiment.

Figure 12:
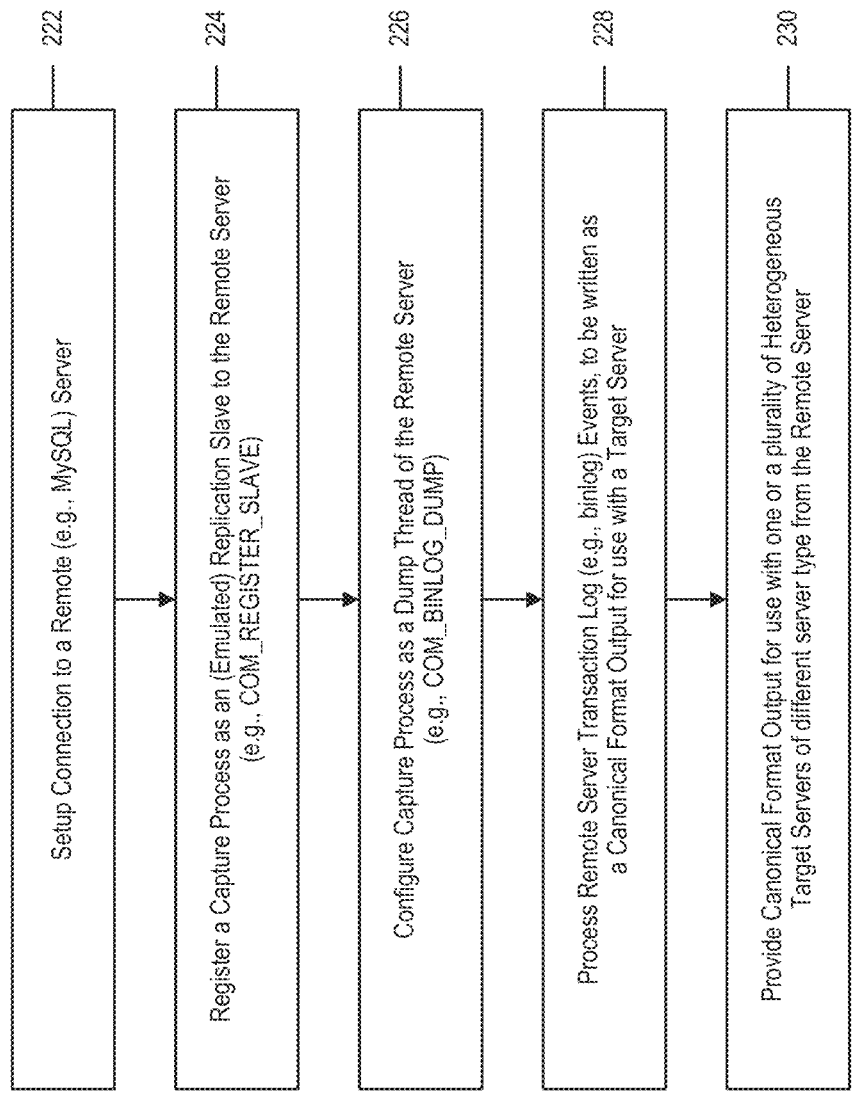

FIG. 12 illustrates an example process for providing heterogeneous database replication from a remote server that uses dump threads, in accordance with an embodiment.

Figure 13:
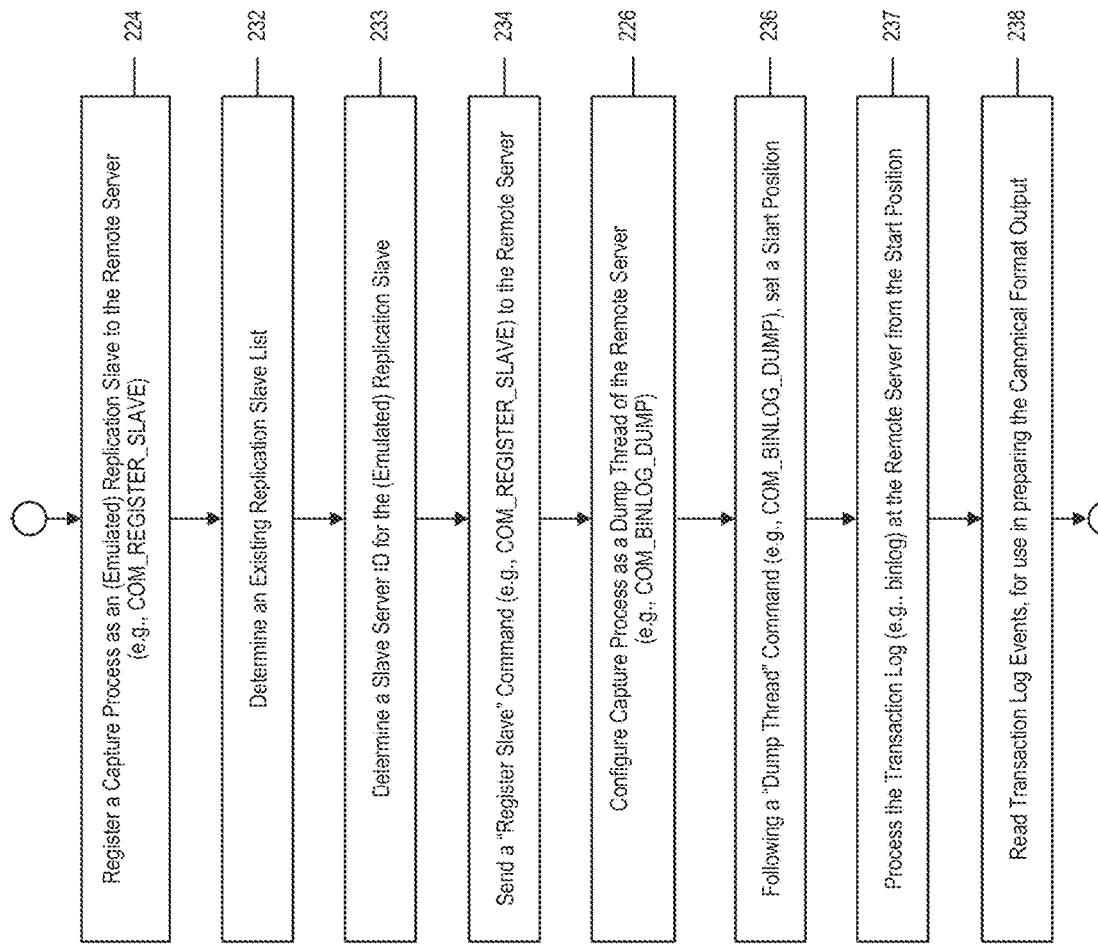

FIG. 13 further illustrates an example process that uses dump threads, in accordance with an embodiment.

Figure 14:
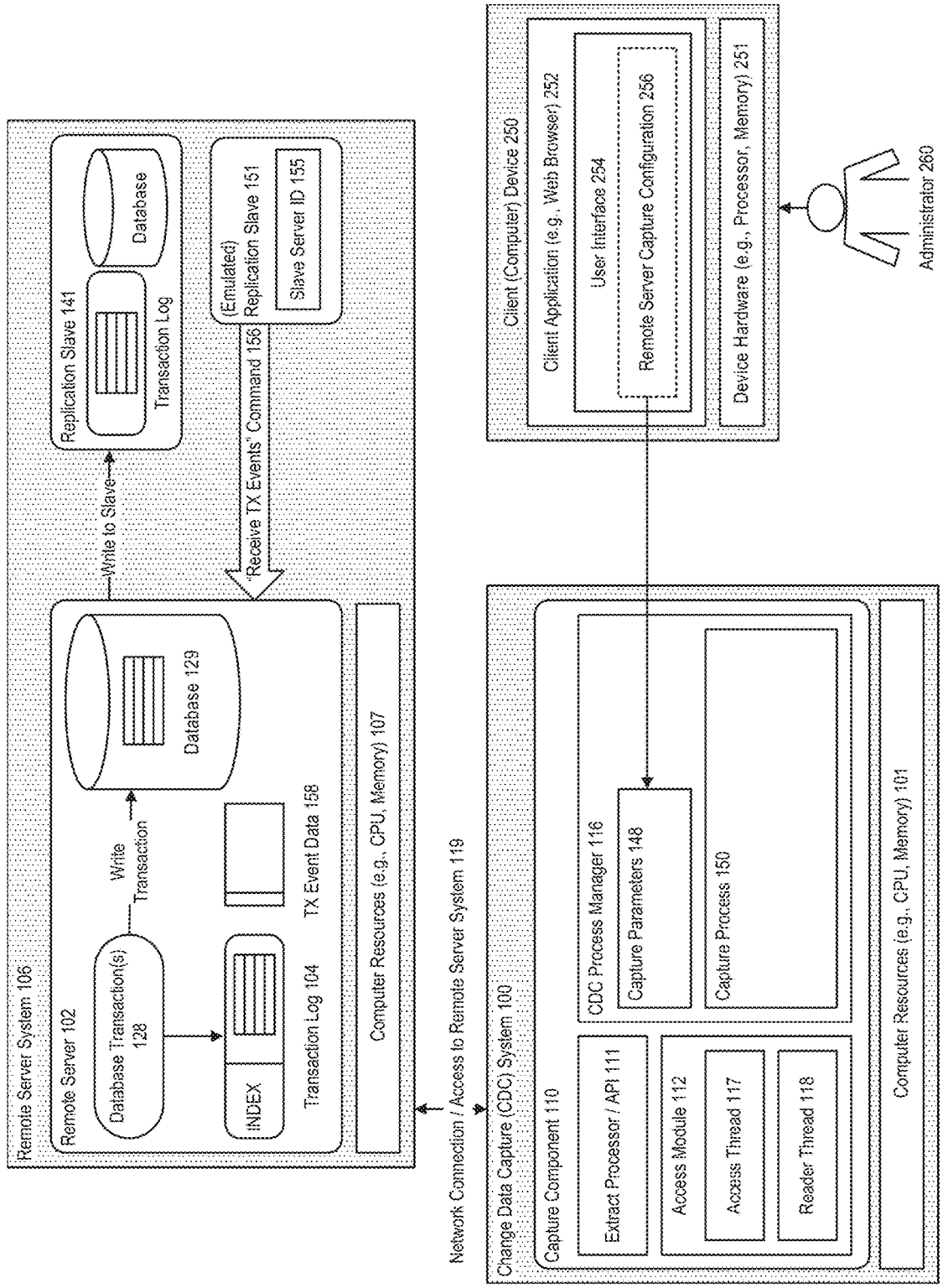

FIG. 14 illustrates the use of a client device and user interface to configure a change data capture system to enable heterogeneous database replication from a remote server, in accordance with an embodiment.

Figure 15:
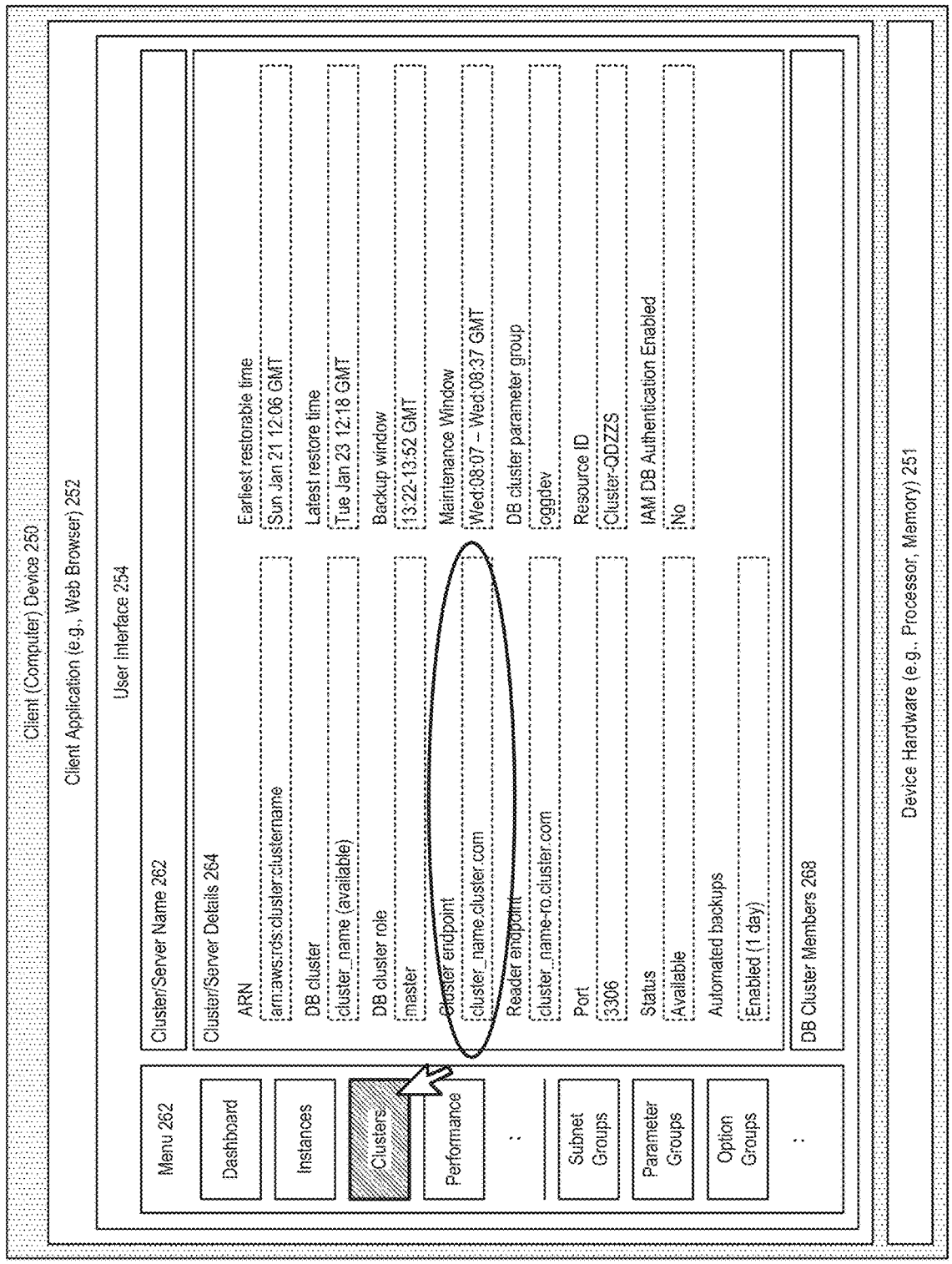

FIG. 15 illustrates an example user interface that enables configuration of a change data capture system to enable heterogeneous database replication from a remote server, in accordance with an embodiment.

Figure 16:
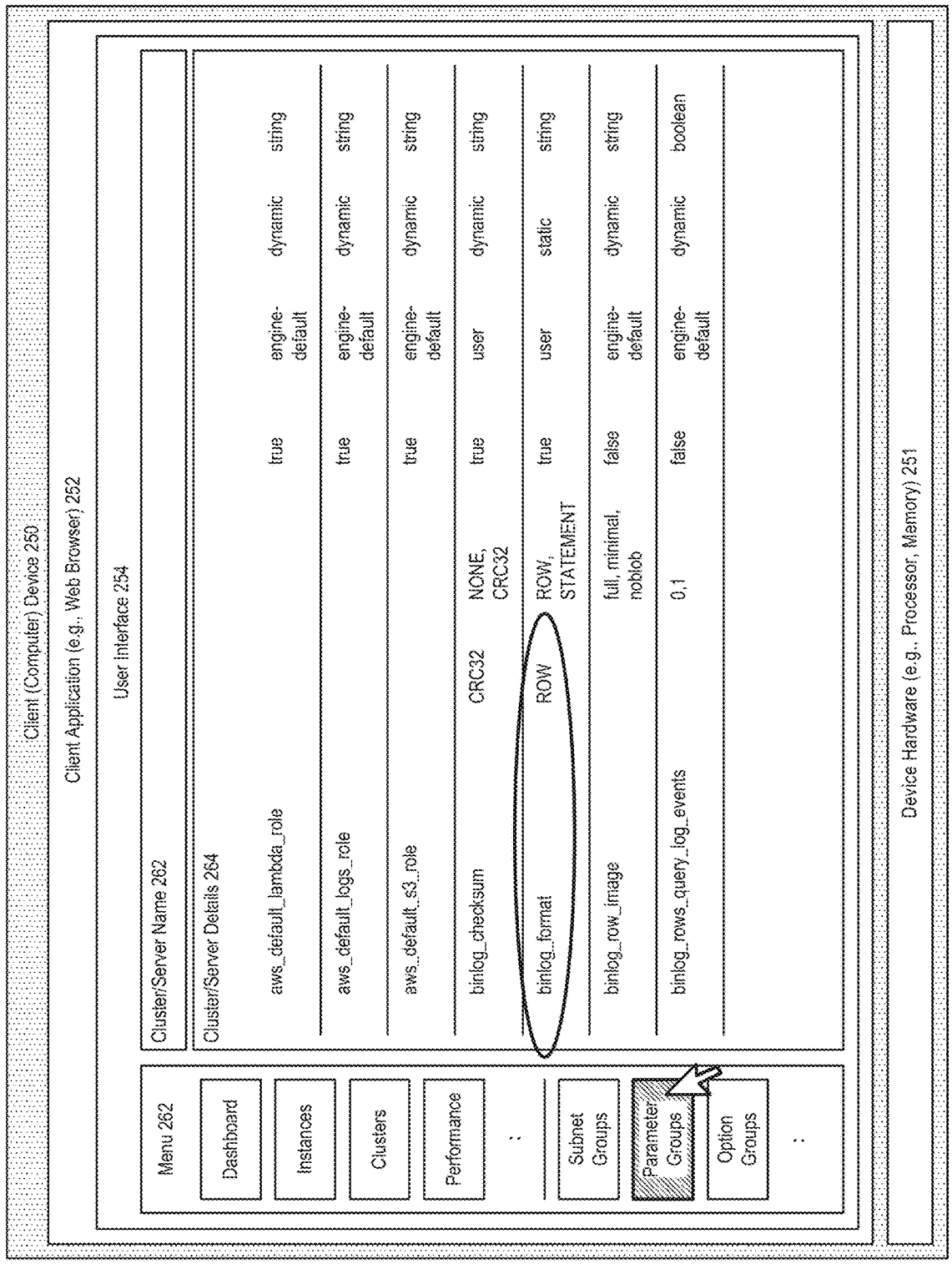

FIG. 16 further illustrates an example user interface that enables configuration of a change data capture system to enable heterogeneous database replication from a remote server, in accordance with an embodiment.

DETAILED DESCRIPTION

As described above, in some data replication environments, a change data capture (CDC) system can operate by reading a record of database transactions from transaction log files, and using that in replicating data, or modifications to a database, between source and target servers.

However, such an approach generally requires the capture process to know the location of, and be able to directly access, the transaction log files stored locally. If, for example, a source database server is running on a different computer from the capture process, or on a different network, or within an access-restricted environment such as a cloud environment, then the capture process may not be able to access its transaction log files.

Examples of approaches that can be used to address these considerations, although with various limitations, include:

If the storage location or directory in which the transaction logs are located can be shareably-mounted, e.g., using network file system (NFS), then a capture process can process remote transaction log files as local files. However, as described above, if, for example, a source database server is running on a different computer from the capture process, or on a different network, or within an access-restricted environment such as a cloud environment, then the capture process may not be able to access its transaction log files.

A transaction log utility software or program can be used to download and stream transaction logs from a remote server to a local computer or machine, where they can be processed. However, this includes creating an additional copy of the transaction log files, resulting in input/output (I/O) and coordination overhead; and also incurs an additional layer of processing between the reading and the processing of the transaction log.

A separate (native) replication slave, configured on the same computer or machine as the change data capture system, can connect to the remote server, replicate database transactions locally, and generate a replica transaction log for those database transactions that are on the remote server, which can then be processed locally. However, this approach similarly includes creating an additional copy of the transaction log files; together with the associated I/O, coordination overhead; and additional layer of processing.

Database Replication from Remote Servers

In accordance with an embodiment, described herein is a system and method for heterogeneous database replication from a remote server, for example a remote database server. A capture process can be registered as a replication slave to the remote server, and configured to receive transaction event data from that server. Transaction log events associated with a modification to the database at the remote server can be processed, and output as change data, in a canonical format output, for use with one or more heterogeneous targets, for example a target database server or message queue.

A technical purpose of the systems and methods described herein includes that the process enables capture of transaction log events associated with database transactions at a remote server that may be located on a different computer or network, or within an access-restricted environment such as a cloud environment, without the need to create additional copies of its transaction logs.

For example, in accordance with an embodiment, the system and method described herein enables a change data capture system to utilize transaction log data from a remote server, irrespective of that server's location, and without needing to be aware of the transaction logs' physical location.

In accordance with an embodiment, a remote server's connection parameters can be specified via a user interface or configuration file, which enables a capture process to make a connection to the server and receive transaction log data from the server. The received data can be processed in a similar manner as a local capture, including, for example, outputting the transaction log data to a canonical format output, e.g., an Oracle GoldenGate trail information or file, or another type of file format. The canonical format output can then be read and applied to a target by a delivery process.

Wth this approach, there is no need to create an additional copy of the transaction log files, nor is there a need for an additional layer of processing between the reading and the processing of the transaction log.

In accordance with an embodiment, a user interface or configuration file associated with the capture process, e.g., a capture parameter file, enables a user to specify that a remote server from where the transaction should be replicated is "remote"; together with any required connection parameters, for example a remote database server name, userid, and password; which the system can then use to replicate database transactions from that remote server.

Figure 1:
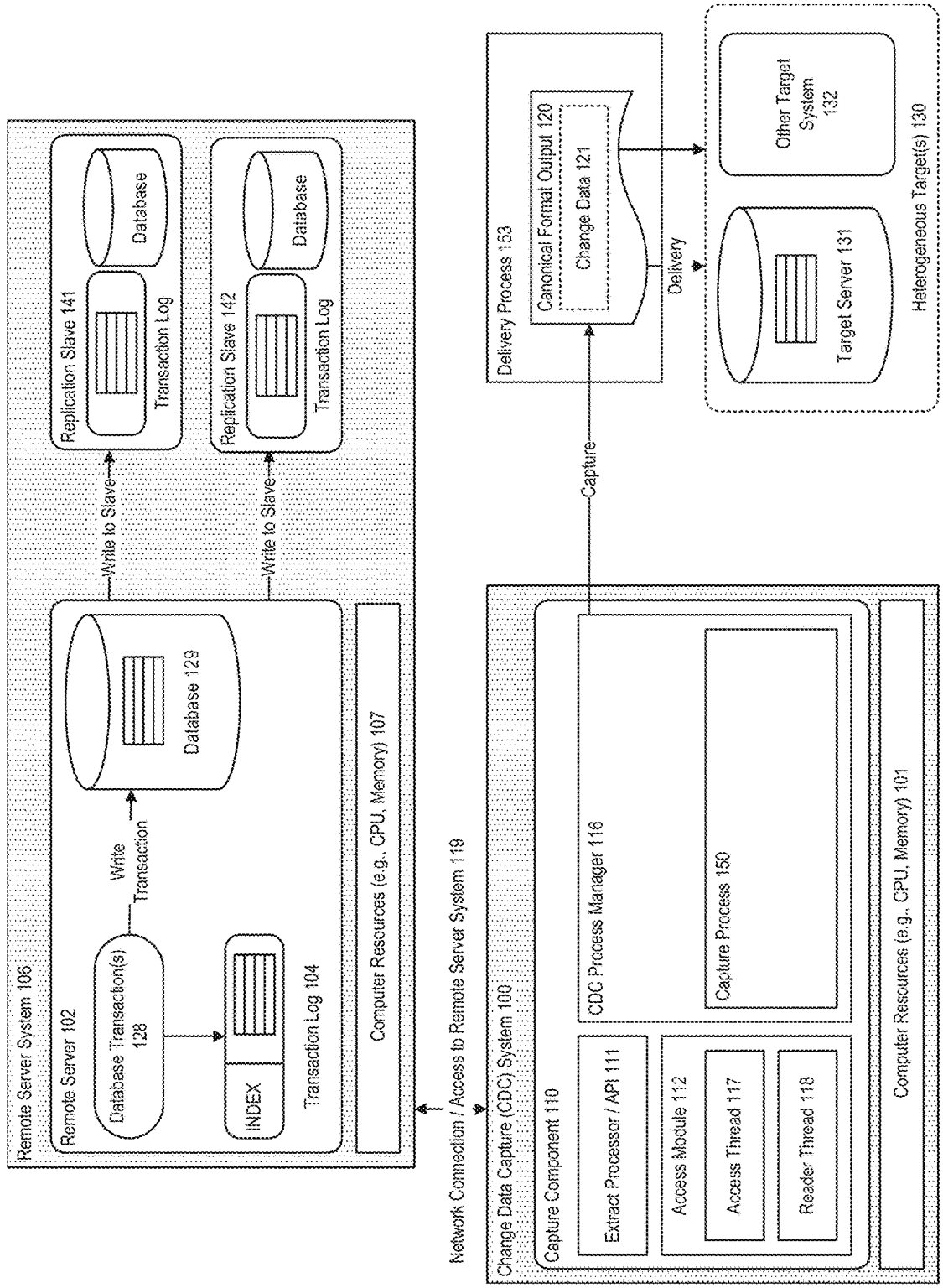
FIG. 1 illustrates the use of a change data capture system to enable heterogeneous database replication, in accordance with an embodiment.

FIG. 1 illustrates the use of a change data capture system to enable heterogeneous database replication, in accordance with an embodiment.

As illustrated in FIG. 1, in accordance with an embodiment, a change data capture system 100, which can be provided at a computer that includes one or more computer resources (e.g., CPU, memory) 101, can be configured to capture change data from a remote server system 106, that similarly includes one or more computer resources 107, and further comprises a remote server 102 (e.g., a MySQL server).

In accordance with an embodiment, the change data capture system can include a capture component 110, that can be provided as software or program code executable by a computer system or other processing device, for example an Oracle GoldenGate component, which can include an extract processor/application program interface (API) 111 that enables communication with the remote server; an access module 112 (e.g., in an Oracle GoldenGate environment, a vendor access module (VAM)); and a CDC process manager 116.

In accordance with an embodiment, the access module can include one or more access thread 117, and reader thread 118, for use in accessing records at a data source, for example via a network connection/access to the remote server system 119.

In accordance with an embodiment, the remote server can include one or more nodes that enable transaction(s) 128 to be applied to a database 129, wherein data changes are written to a transaction log 104 (e.g., in a MYSQL environment, a MYSQL binary log or mysqlbinlog file).

In accordance with an embodiment, a capture process 150, and a delivery process 153, converts the change data that is read from the data source, into a canonical format output 120, including change data 121 indicative of the modifications caused to the database by the database transaction(s), for consumption by one or more heterogeneous targets 130, including, in some embodiments, forming commands or queries according to a particular target, and applying those commands or queries to that target.

In accordance with an embodiment, the one or more targets can be, for example, a target server 131 or other target system 132, examples of which can include one or more of a database, message queue, or other types of target servers or systems.

In accordance with an embodiment, the remote server can be associated with one or more replication slaves 141, 142, which enable changes to the database to be replicated to other nodes for use within the remote server system.

Log-Based Replication

As described above, although a change data capture system can operate by reading a record of database transactions from transaction log files—if a source database server is running on a different computer from the capture process, or on a different network, or within an access-restricted environment such as a cloud environment, then the capture process may not be able to access its transaction log files.

Figure 2:
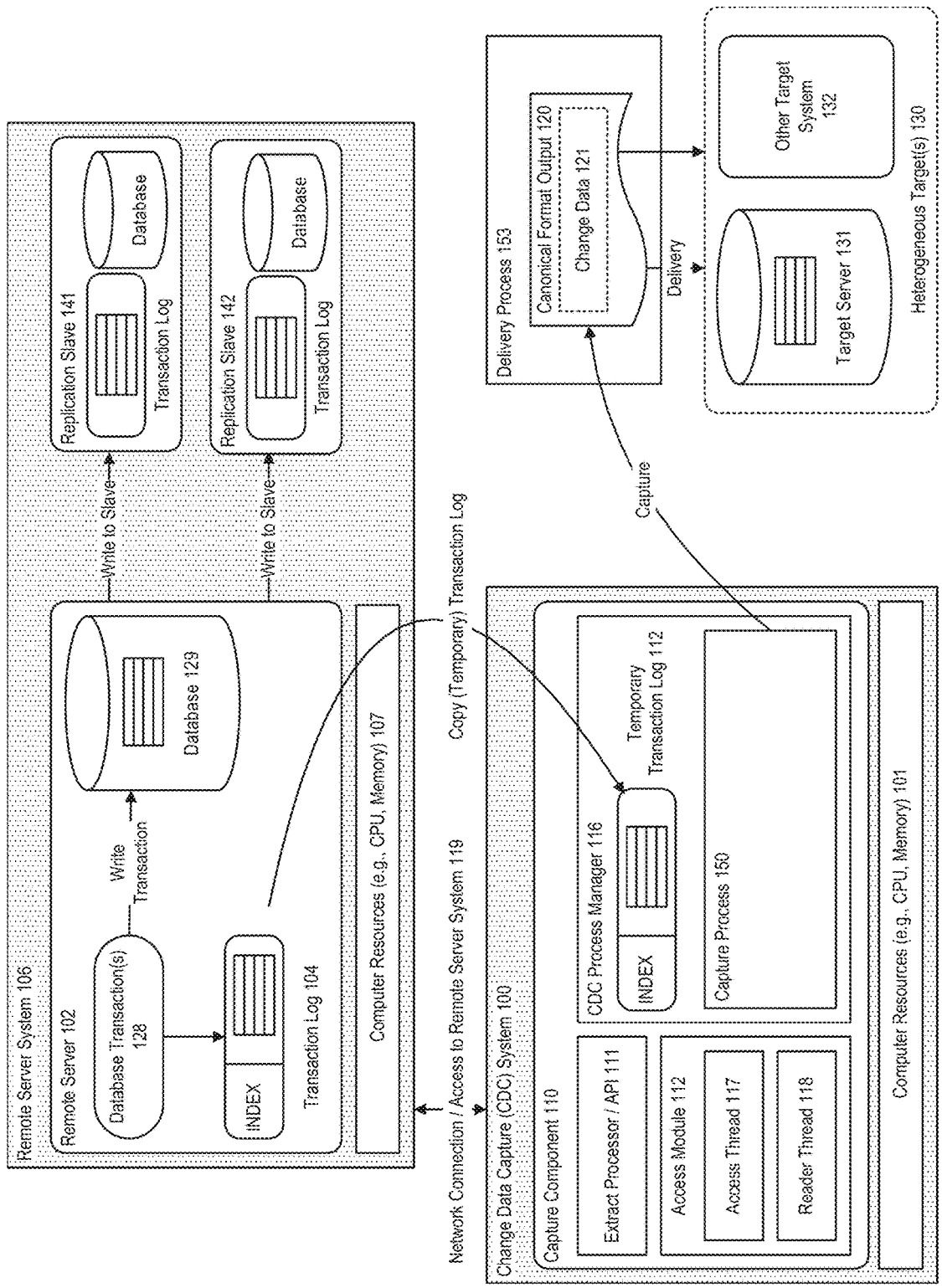
FIG. 2 illustrates a change data capture system that includes the copying of transaction logs, in accordance with an embodiment.

FIG. 2 illustrates a change data capture system that includes the copying of transaction logs, in accordance with an embodiment.

As illustrated in FIG. 2, in accordance with an embodiment, the remote server 102 can, for example, be associated with a software utility (e.g., in a MYSQL environment, a mysqlbinlog utility), which can be used to download, stream, or otherwise copy transaction logs from the remote server to the computer where the capture process is running. This approach includes writing the transaction logs to one or more intermediate or temporary transaction log files 112 on the computer running the capture process. The capture process can then read and process this intermediate file, and process and output or write the database transactions to one or more canonical format output, e.g., trail information or trail files, to be read by the delivery process and applied on a target, e.g., database server.

However, as described above, a problem with this approach is that it includes creating an additional copy of the transaction log files; together with the associated I/O, coordination overhead; and additional layer of processing.

Capture Process

To address the above considerations, in accordance with an embodiment, a capture process can instead be registered as a replication slave to the remote server, and configured to receive information from that server, including transaction event data.

Figure 3:
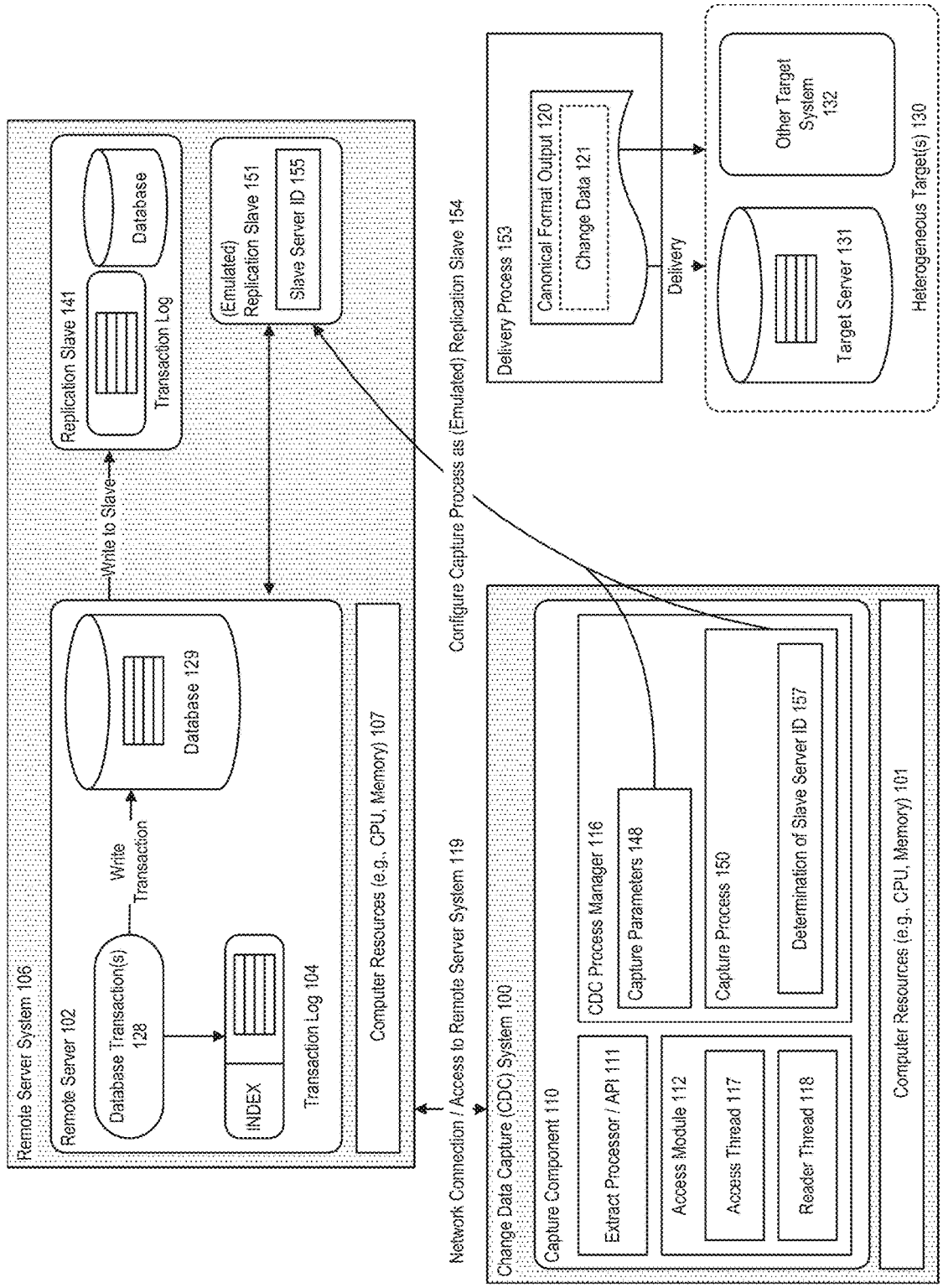
FIG. 3 illustrates the use of a change data capture system to enable heterogeneous database replication from a remote server, including the use of a capture process operating as an (emulated) replication slave, in accordance with an embodiment.

FIG. 3 illustrates the use of a change data capture system to enable heterogeneous database replication from a remote server, including the use of a capture process operating as an (emulated) replication slave, in accordance with an embodiment.

As illustrated in FIG. 3, in accordance with an embodiment, the remote server is configured to deliver transaction log data to its replication slaves. Replication slaves can make requests for the transaction log data as long as they can make a connection to the remote server. The replication slaves can be located on the same computer or machine where the remote server runs, or can be located on a different machine.

In accordance with an embodiment, the capture process is configured (154) to appear and operate as an (emulated) replication slave 151 to the remote server, including use of a process or algorithm for determining a slave server identifier (ID) 157, wherein the slave server ID 155 enables operation with the remote server. An example process or algorithm for determining a slave server ID is illustrated below. Once the capture process is connected to the server to appear and operate as an (emulated) replication slave, it can request data from the server in a loop.

In accordance with an embodiment, a user can configure the remote server connection parameters using a capture parameters file, or other manner or means of specifying capture parameters 148. The capture process can use this information to make the connection to the server, and start receiving the transaction log data from the server, irrespective of where the server is located. Once the capture process starts reading the transaction log data from the remote server, this data can then be processed in a similar manner as a local capture, including, for example, outputting the transaction log data to a canonical format output or file.

In accordance with an embodiment, the registering of a capture process as a replication slave to a remote server, and configuring the capture process to receive information from that server, including transaction event data, enables transaction log events, that are indicative of database transactions to modify data at a database associated with the remote server, to be processed and output for use with a target database server.

FIG. 4 further illustrates the use of a change data capture system to enable heterogeneous database replication from a remote server, in accordance with an embodiment.

As illustrated in FIG. 4, in accordance with an embodiment, the capture process connects to the remote server as a client or client process. When the capture process connects to the remote server, it is first registered with the server as a replication slave. In accordance with an embodiment, a command such as a "register slave" command 152 (e.g., in a MYSQL environment, a COM_REGISTER_SLAVE command) can be sent to the remote server by the capture process, in order to register itself as a replication slave of the remote server.

In accordance with an embodiment, the "register slave" command enables the capture process to communicate with the remote server, after making connection to the remote server, and before the remote server can send any data to the capture process. The command arguments can include the remote server's network address, user name on remote server, the password and a slave server ID (e.g., Server_ID) associated with the capture process.

In accordance with an embodiment, after making connection to the remote server, the capture process sends the "register slave" command with connection parameters and its slave server ID. The remote server can then register the capture process as one of its replication slaves.

FIG. 5 further illustrates the use of a change data capture system to enable heterogeneous database replication from a remote server, in accordance with an embodiment.

As illustrated in FIG. 5, in accordance with an embodiment, once the capture process is registered as a replication slave to the remote server, the capture process can request the server to send data, including transaction (TX) event data 158, for example using a command 156 to "receive transaction (TX) events".

For example, in accordance with an embodiment, to receive the transaction log data from the server, after registering with the remote server, the server can start a dump thread to the capture process; by which the capture process can receive the transaction log data; and wherein the slave server ID associated with the dump thread is the same as that which was registered in the previous step, and request transaction event data via that dump thread.

In accordance with other embodiments, depending on the type of remote server, the capture process can instead use other methods that enable it to be registered as a replication slave to the remote server, and configured to receive information from that server, including transaction event data.

FIG. 6 further illustrates the use of a change data capture system to enable heterogeneous database replication from a remote server, in accordance with an embodiment.

As illustrated in FIG. 6, in accordance with an embodiment, the capture process is configured to operate a process or algorithm 161 for determining a log positioning information that enables operation with the remote server. Once this command is successfully returned, the server can start sending the transaction log data, beginning from the start position 162 (e.g., a log number and position) sent to the server. The capture process then can request the data from the server, for example in a cli_safe_read call in a loop 163, which data can then be written as an output 164, e.g., to the canonical format output.

Setting the Start Position

As described above, in accordance with an embodiment, the capture process is configured to operate a process or algorithm for determining a log positioning information that enables operation with the remote server. Once this command is successfully returned, the server can start sending the transaction log data, beginning from the start position.

For example, in accordance with an embodiment, a command, e.g., COM_BINLOG_DUMP can be sent with a transaction log name and start offset position. Initial positioning can be supported by timestamp, offset and default.

In accordance with an embodiment, when setting the initial position by log offset, a log number received from the user can be mapped to the log name. Then, the binary log name and the start offset given by user is supplied to the command, and the command is sent to the server In accordance with an embodiment, a timestamp of the events can be matched with timestamp to be positioned. On finding the correct match in a particular binlog file, the initial offset of the event corresponding to that timestamp is retrieved, and then the start position is set at that offset.

In accordance with an embodiment, a first binary log name can be retrieved from the list of binlogs created at the start of the capture process, and the default log offset sent.

The above examples are provided in accordance with an embodiment, to illustrate various methods of setting the start position; in accordance with other embodiments, other methods can be used.

Heterogeneous Database Replication

FIG. 7 illustrates how the change data capture system provides a canonical format output that enables heterogeneous database replication between servers of different types.

As described above, in accordance with an embodiment, transaction log events associated with a modification to the database at the remote server can be processed, and output as change data, in a canonical format output, for use with one or more heterogeneous targets, for example a target database server or message queue.

For example, as illustrated in FIG. 7, in accordance with an embodiment, the capture process, together with one or more delivery process(es) 176, can be used to convert the change data that is read from the data source, for example a remote server of a first type, into a canonical format output, for consumption by one or more heterogeneous targets, including in this example, a second type of target server 172 and/or a third type of target server 174, by forming commands or queries according to each particular target, and applying those commands or queries to that target.

Database Replication Method

FIG. 8 illustrates a process for providing heterogeneous database replication from a remote server, in accordance with an embodiment.

As illustrated in FIG. 8, in accordance with an embodiment, a method for heterogeneous database replication from a remote server, for example a remote server, can include, at step 182, setting up a connection to a remote server.

At step 184, the process can include registering a capture process (e.g., Oracle GoldenGate capture) as a capture process operating as an (emulated) replication slave to the remote server.

At step 186, the process can include configuring a capture process to receive transaction event data from the remote server.

At step 188, the process can include processing remote server transaction log events, to be output or written as a canonical format output, for use with a target server.

At step 190, a canonical format output is provided for use with one or a plurality of heterogeneous target servers of different server type from the remote server.

FIG. 9 further illustrates a process for providing heterogeneous database replication from a remote server, in accordance with an embodiment.

As illustrated in FIG. 9 (wherein steps 184 and 186 can be as described above), in accordance with an embodiment, the process can include, at step 192, determining an existing replication slave list.

At step 193, a slave server ID is determined for the capture process operating as the (emulated) replication slave.

At step 194, the capture process is registered as the (emulated) replication slave to the remote server.

At step 196, a start position is set for use with the transaction log.

At step 197, the transaction log at the remote server is processed from the start position.

At step 198, the transaction log events are read and used to prepare the canonical format output.

Example Implementation

The following section provides, for purposes of illustration, a description of an example embodiment for capture of change data from a distributed data source system, such as, for example, a MySQL server operating a MySQL database.

In accordance with other embodiments, other types of distributed data sources or databases can be supported. For purposes of illustration, various details are provided below in order to provide an understanding of various embodiments. However, embodiments can also be practiced without specific details. The following description is not intended to be restrictive.

FIG. 10 illustrates an example of a change data capture system with a remote server that uses dump threads 206, in accordance with an embodiment.

As illustrated in FIG. 10, in accordance with an embodiment, the capture process connects to the remote server system 202 and remote server (e.g., a MySQL server) 204 as a client or client process. When the capture process connects to the remote server, it is first registered with the server as a replication slave. In accordance with an embodiment, a "register slave" command (e.g., in a MYSQL environment, a COM_REGISTER_SLAVE command) can be sent to the remote server by the capture process, in order to register itself as a replication slave of the remote server.

In accordance with an embodiment, and as described above, the "register slave" command enables the capture process to communicate with the remote server, after making connection to the remote server, and before the remote server can send any data to the capture process. The command arguments can include the remote server's network address, user name on remote server, the password and a slave server ID (e.g., Server_ID) associated with the capture process.

In accordance with an embodiment, after making connection to the remote server, the capture process sends the "register slave" command with connection parameters and its slave server ID. The remote server can then register the capture process as one of its replication slaves.

FIG. 11 further illustrates an example of a change data capture system with a remote server that uses dump threads, in accordance with an embodiment.

As illustrated in FIG. 11, in accordance with an embodiment, and as described above, the capture process is configured to operate a process or algorithm for determining a log positioning information that enables operation with the remote server. Once this command is successfully returned, the server can start sending the transaction log data, beginning from the start position (e.g., a log number and position) sent to the server. The capture process then can request the data from the server, for example in a cli_safe_read call in a loop 210, which data can then be written as an output to the canonical format output.

In accordance with an embodiment, a "dump thread" command 208 (e.g., in a MYSQL environment, a COM_BINLOG_DUMP command) creates the dump thread inside the remote server, and the capture process starts receiving the transaction log data over the network via this dump thread. The "dump thread" command is sent to the server with the transaction (binary) log name, start position and flags, wherein the flag values indicate whether the dump thread continues after reading the last set of data in the last transaction log.

Setup Connection to Remote Server

In accordance with an embodiment, the capture process creates a dedicated connection to the remote server, in order to setup the capture process to appear and operate as an (emulated) replication slave and to continuously retrieve event stream data from the remote server. After the connection is established, the following connection attributes are also set:

MYSQL_OPT_SSL_MODE: The client's SSL requirements.

MYSQL_OPT_PROTOCOL: The default communication protocol is TCP.

MYSQL_OPT_CONNECT_ATTR_ADD: This adds connection information into performance_schema.session_connect_attrs; for example, the program name can be added, which can be helpful on monitoring or troubleshooting the program.

In accordance with an embodiment, the remote server can be informed whether the client is checksum aware or not, since, e.g., MySQL server does not support replication slaves that are not checksum aware. For example, SET ©master_binlog_checksum='NONE' tells the server if the client understands checksum algorithms. If the client does not inform the remote server, then the server returns an error on cli_safe_read, instead of sending the data back to the client.

Registration of Capture Process

In accordance with an embodiment, the remote server registers the list for all of its replication slaves for checkpointing and bookkeeping purposes.

As described above, in accordance with an embodiment, the command COM_REGISTER_SLAVE can be sent to the remote server, by the capture process, to cause itself to be registered as a replication slave to the server, and can be supplied with connection parameters (e.g., the remote server's network address, userid, and password) and a slave server ID.

In accordance with an embodiment, the slave server ID, with which the capture process is registered, is unique across all existing remote server replication slaves. If the slave server ID supplied with the capture process conflicts with any other existing replication slave processes, then the already running process is terminated by the server. A unique slave server ID is generated by the capture process and sent to the server as a command argument to the command COM_REGISTER_SLAVE, as further described below.

Replication Slave List

In accordance with an embodiment, a "show slave hosts" command provides detailed information of all the hosts which are registered as replication slaves to the remote server. This list includes actual/true replication slaves, as well as processes that are registered as replication slaves but are not actual/true replication slaves to the remote server, for example capture processes operating as (emulated) replication slaves.

In accordance with an embodiment, the 'Server_ID' column from the output of this command gives the IDs of all the replication slave servers. The value in the 'Server_ID' column is the same as that supplied by the capture process at the time of sending the command COM_REGIS- TER_SLAVE to the remote server. This variable is used by the server as an internal variable, and the "show slave hosts" command provides a way to obtain the Server_ID values for all the replication slave servers in a client application. The output from this command is parsed to take the 'Server_ID' values, and then store these values in a sorted list.

The example provided below (Example 1) illustrates an example software method or program code to determine a list of all the slave server IDs, in accordance with an embodiment:

```
int CMySQLContext::getSlaveListRemote
(std::vector<unsigned int>* slaveList)
{
...
  MYSQL_RES* result;
  MYSQL_ROW row;
  std::string query = "show slave hosts";
  int retVal = executeQuery(query, m_mysqlCtx.conn);
...
  result = mysql_store_result(m_mysqlCtx.conn);
  if (result)// there are rows
  {
    int row_count = result->row_count;
    if(row_count > 0)
    {
      for(int i=0; i < row_count; ++i)
      {
        row = mysql_fetch_row(result);
        if((row != NULL))
        {
          if(row[0] != NULL)
          {
            slaveList->push_back(atoi(row[0]));
          }
        }
      }
    }
    std::sort(slaveList->begin( ), slaveList->end( ));
    mysql_free_result(result)
  } ...
} ...
  return retValue;
}
```

Example 1

Slave Server ID Determination

As described above, in accordance with an embodiment, the capture process is configured to appear and operate as an (emulated) replication slave to the remote server, including use of a process or algorithm for determining a slave server ID that enables operation with the remote server.

In accordance with an embodiment, the slave server ID of the registered replication slave must be a unique value and not conflict with other/existing registered replication slaves. An example process or algorithm to generate a unique slave server ID is provided below, for purposes of illustration. In accordance with other embodiment, other methods can be used to determine the unique server ID value.

If the lowest slave server ID is greater than 1, then decrement the lowest slave server ID and assign the resultant value to the capture process.

If there are gaps between two existing consecutive slave server IDs, then increment the lower bound slave server ID by 1, and assign the resultant value to the capture process.

If both above cases do not hold, then increment the highest slave server ID by 1, and assign the resultant value to the capture process.

In accordance with an embodiment, the slave server IDs generated using the above process or algorithm should be unique across all the remote server's replication slaves, and across all the instances of the capture component. To create unique slave server ID values for each instance of the capture process, the process or algorithm (logic) can be implemented inside a critical section, which guarantees that for the capture process the slave server ID values can be generated as unique values.

In some instances, a user can create a separate replication slave to the remote server, and can cause the existing process to terminate, before creating a new replication slave. In such instances, the user should be careful not to create a replication slave with an ID that conflicts with any existing replication slave.

The example provided below (Example 2) illustrates an example software method or program code to generate a slave server ID (e.g., Server_ID) within the capture process, in accordance with an embodiment:

```
unsigned int CMySQLContext::getCurrentSlaveIdRemote
( std::vector<unsigned int>* slaveList)
{
  unsigned int slaveId;
  unsigned int index = 0;
  if (slaveList->empty( ))
  {
    slaveId = 1;
    return slaveId;
    // Return the slave ID as 1 if there are no running slaves
    // on this server.
  }
    // The slaveList is a sorted list of Server_IDs.
  if( slaveList->at(0) - 1 > 1 )
  {
    slaveId = slaveList->at(0) - 1;
  }
  else if(slaveList->size( ) == 1)
  {
    slaveId = slaveList->at(0) + 1;
  }
  else
  {
    for( ; index < slaveList->size( )- 1 ; ++index)
    {
      // Looking for gaps between two Server_IDs. Increment
      // slave id by one. Check if it is not same as the next
      // in the list. Retry if it is same, if not then we
      // have the slave id after incrementing the current.
      if ( slaveList->at(index) + 1 != slaveList->at( index + 1 ))
      {
        break;
      }
    }
    slaveId = slaveList->at(index) + 1 ;
  }
  return slaveId;
}
```

Example 2

The example process or algorithm illustrated above is provided by way of example; in accordance with other embodiment, other methods can be used to determine a unique server ID value.

COM_REGISTER_SLAVE Command

In accordance with an embodiment, after generating the Server_ID value, the command COM_REGISTER_SLAVE is sent to the remote server by giving values to Server_ID, remote server name, user ID, and password, as a parameter to the command.

The example provided below (Example 3) illustrates an example software method or program code to register the capture process to operate as an (emulated) replication slave to a remote server, in accordance with an embodiment:

```
...
int4store(pos, m_slaveIdRemote);
pos+= 4;
pos=CMySQLUtility::net_store_data(pos, (uchar*)
CMySQLCommanData::getServerName( ), hostLen);
pos=CMySQLUtility::net_store_data(pos, (uchar*)
CMySQLCommanData::getUserId( ), userLen);
pos=CMySQLUtility::net_store_data(pos, (uchar*)
CMySQLCommanData::getPasswd( ), passwordLen);
int2store(pos, (uint16) CMySQLCommanData::getPortNumber( ));
pos+= 2;
int4store(pos, 0);
pos+= 4;
// The master will fill in master_id.
int4store(pos, 0);
pos+= 4;
(simple_command(mysql_remote, COM_REGISTER_SLAVE,
buf, (size_t) (pos – buf), 0))
...
```

Example 3

Capture Process as a Dump Thread

In accordance with an embodiment, after registering the capture process as a replication slave server to the remote server, the command COM_BINLOG_DUMP is sent to the remote server.

In accordance with an embodiment, sending the command COM_BINLOG_DUMP to the remote server creates a capture process operating as an (emulated) replication slave of this remote server, and keeps capturing the binlog events remotely. The command COM_BINLOG_DUMP is packed with its parameter values, before sending to the remote server. The following are the parameters for the command COM_BINLOG_DUMP:

Server_ID: The capture process operates as an (emulated) replication slave and it should be given a Server_ID by which the remote server identifies it. This is set with the same Server_ID value that was used at the time of registering capture process as a replication slave to the remote server. If this Server_ID conflicts with any other running (emulated or actual/true) replication slave, then the already running instance will be killed.

Binlog Name: For remote capture, it is mandatory to provide the binlog file name upfront, since the command COM_BINLOG_DUMP requires it. The server then starts looking for data to be served following that binary log. If the binary log is not present, then the command execution returns back the error specifying the same reason.

Start position: The command COM_BINLOG_DUMP accepts only 4 bytes for the start position offset, so for remote capture, binary log files that are more than 4 GB in size cannot be supported.

Dump flags: There are two flags available for setting in the COM_BINLOG_DUMP. One of the flags is BINLOG_DUMP_NON_BLOCK; and the other is 0. Setting the flag to BIN_LOG_DUMP_NON_BLOCK will disconnect the capture process (capture application) after reading the end of the log. The capture process continuously keeps reading so the flag should be set to 0.

In accordance with an embodiment, after populating all the above fields, the command COM_BINLOG_DUMP is sent to the server using a simple_command library function.

The example provided below (Example 4) illustrates an example software method or program code to create a dump thread inside the capture process, in accordance with an embodiment:

```
MYSQLStatus CMySQLBinLog::setInitialPositionRemote
(uint64_my_t logNum, ulonglong offset)
{
...
    std::string binlogFile(it->second);
    std::size_t tlen = binlogFile.size( );
...
    const std::size_t BINLOG_NAME_INFO_SIZE = tlen;
    command = COM_BINLOG_DUMP;
    std::size_t allocation_size = ::BINLOG_POS_OLD_INFO_SIZE +
BINLOG_NAME_INFO_SIZE +
::BINLOG_FLAGS_INFO_SIZE +
::BINLOG_SERVER_ID_INFO_SIZE + 1;
    if ((command_buffer = (uchar *)malloc(allocation_size)) == NULL)
...
    uchar* ptr_buffer = command_buffer;
    int4store(ptr_buffer, (uint32)offset);
    ptr_buffer += ::BINLOG_POS_OLD_INFO_SIZE;
    int2store(ptr_buffer, 0);
    // 0 for stop never, we intend to keep reading the binlog files.
    ptr_buffer += ::BINLOG_FLAGS_INFO_SIZE;
    int4store(ptr_buffer, CMySQLContext::getInstance( )->
getSlaveIdRemote( ));
    ptr_buffer += ::BINLOG_SERVER_ID_INFO_SIZE;
    memcpy(ptr_buffer, binlogFile.c_str( ),
BINLOG_NAME_INFO_SIZE);
    ptr_buffer += BINLOG_NAME_INFO_SIZE;
    command_size = ptr_buffer – command_buffer;
    if (simple_command(mysql_remote, command, command_buffer,
command_size, 1))
...
    return retValue;
}
```

Example 4

In accordance with an embodiment, once the command COM_BINLOG_DUMP is sent to the server, the capture process can use, e.g., the MySQL client library function cli_safe_read, or a mysql_binlog_fetch, in a loop to read the binlog events data streams from the remote server.

Setting the Start Position

As described above, in accordance with an embodiment, the capture process is configured to operate a process or algorithm for determining a log positioning information that enables operation with the remote server. Once this command is successfully returned, the server can start sending the transaction log data, beginning from the start position sent to the server.

In accordance with an embodiment, a command, e.g., COM_BINLOG_DUMP can be sent with a binlog (transaction log) name, and the start offset position. After the COM_BINLOG_DUMP is successful, the remote server starts sending transaction log data, beginning from that offset in that binlog. The command COM_BINLOG_DUMP sets the initial read position for the capture process.

In accordance with an embodiment, initial positioning can be supported by timestamp, offset, and default. The command COM_BINLOG_DUMP is used to achieve all of these positioning types for remote transaction replication.

Setting Start Position by Offset—COM_BINLOG_DUMP

In accordance with an embodiment, setting the initial position by log offset is natural to use of the command COM_BINLOG_DUMP. The log number received from the user is mapped to the binary log name. Then the binary log name and the start offset given by the user is supplied to the command COM_BINLOG_DUMP. The command is sent to the server, and the remote server starts sending the binlog events, beginning from that position.

Setting Start Position by Timestamp

In accordance with an embodiment, a list of all existing transaction log files along with their timestamps (format descriptor event timestamp) is created at the start of the capture process. Later, at the time of positioning by timestamp, all the binlog file names are sent to the COM_BINLOG_DUMP in the reverse order and read from the beginning. The timestamp of the events are matched with timestamp to be positioned. On finding the correct match in a particular binlog file, the initial offset of the event corresponding to that timestamp is retrieved, and then the start position is set at that offset by sending the command COM_BINLOG_DUMP.

Setting Start Position Default

In accordance with an embodiment, the command COM_BINLOG_DUMP mandates it to pass the log number and the offset as a start position. The first binary log name can be retrieved from the list of binlogs created at the start of the capture process and the default log offset should be sent as 4, which is the first valid offset in MySQL binlog file.

Processing of Transaction Log

In accordance with an embodiment, the transaction logs store every transaction that takes place in any of the database of, e.g., a MySQL instance. A transaction log stores Insert, Update, Delete statements, DDL statements (e.g., Truncate, Alter, and so on). These transaction logs are called the "Write Ahead Logs" (WAL), as they are written first, and then only the data is written to the actual tables in the database. MySQL database uses to these transaction logs in case of database crash for its recovery.

MySQL transaction logs stores this information in the form of various events, wherein each event is specific to a particular task in the transaction, for example:

Query Event: Query event shows the start of a transaction or the statement of a DDL statement.

TableMap Event: TableMap event stores the metadata specific to each table that is logged into the transaction log.

RowsLogEvent: RowsLogEvent contain the actual column data of the table for the operations such as, for example, Insert/Delete/Update statements.

Xid Event: Xid event indicates the commit of a particular transaction.

RotateEvent: Rotate event indicates the end of one transaction log and provides the name of the successor transaction log.

Stop Event: Stop event indicates that the server was stopped.

There are many such events in the transaction logs but these are the most important ones.

Reading of Transaction Log Events

In accordance with an embodiment, a user interface or configuration file associated with the capture process, e.g., a capture parameter file as described above, enables a user to specify that a server from where the transaction is to be replicated is "remote"; together with connection parameters, for example a remote server name, userid and password; which the system can then use to replicate the database transactions from that remote server.

In accordance with an embodiment, the mysqlclient library routine cli_safe_read is called in a loop to receive the continuous stream of binlog events buffer from the remote server. The cli_safe_read receives the complete event data.

In accordance with an embodiment, for small events, the network buffer passed to the cli_safe_read or mysql_binlog_fetch receives the data for the complete event. For the rows log event, a complete row is sent to the client, irrespective of the size.

In accordance with an embodiment, in the case of large objects (LOB), the assumption is that the users have sufficient memory to handle the large LOB row in the memory.

In accordance with an embodiment, in the case of multi-row events, the multiple smaller rows can be combined and sent to the client using mysqld option binlog-row-event-max-size. Depending on the network bandwidth and memory availability, setting it to a reasonable size saves the round trip delay over network.

In accordance with an embodiment, the event buffer is then processed into different event objects based on the different events types. Cache management is not needed as every cli_safe_read call returns a complete event data. For the remote capture, it is not required to process all the events that are processed for the local capture. The library call handles these events within itself, including for example Query event, Tablemap event, Xid event, Write Rows event, Rotate event and Update Rows events, wherein the processing for these events is almost same as in the local capture. Other events such as, for example, Stop and GTID events are not needed, and hence are ignored.

In accordance with an embodiment, the events are processed and output or written to a database-agnostic output, e.g., as a canonically format output. A delivery process can then read the transaction, forms queries according to the target database server, and applies those queries to the target database server.

FIG. 12 illustrates an example process for providing heterogeneous database replication from a remote server that uses dump threads, in accordance with an embodiment.

As illustrated in FIG. 12, in accordance with an embodiment, a method for heterogeneous database replication from a remote server, for example a remote server, can include, at step 222, setting up a connection to a remote server (e.g., MySQL).

At step 224, the process can include registering a capture process (e.g., Oracle GoldenGate capture) as a capture process operating as an (emulated) replication slave to the remote server.

At step 226, the process can include configuring a capture process as a dump thread of the remote server.

At step 228, the process can include processing remote server transaction log events, to be output or written, for example as a trail information (e.g., Oracle GoldenGate trail file) for use with a target database server (e.g., Oracle, MySQL, Db2).

At step 230, a canonical format output is provided for use with one or a plurality of heterogeneous target servers of different server type from the remote server.

FIG. 13 further illustrates an example process which uses dump threads, in accordance with an embodiment.

As illustrated in FIG. 13 (wherein steps 224 and 226 can be as described above), in accordance with an embodiment which uses, e.g., a MySQL environment, the process can include, at step 232, determining an existing replication slave list.

At step 233, a slave server ID is determined for the capture process operating as the (emulated) replication slave.

At step 234, a "register slave" command (e.g., COM_REGISTER_SLAVE) is sent to the remote server.

At step 236, following a "dump thread" command (e.g., COM_BINLOG_DUMP), the start position is set.

At step 237, the transaction log at the remote server is processed from the start position.

At step 238, the transaction log events are read and used to prepare the canonical format output.

User Interface and Administration

FIG. 14 illustrates the use of a client device and user interface to configure a change data capture system to enable heterogeneous database replication from a remote server, in accordance with an embodiment.

As illustrated in FIG. 14, in accordance with an embodiment, a client (computer) device 250, that includes device hardware 251 (e.g., processor/CPU, memory), a client software application (e.g., web browser) 252, and a graphical user interface 254, enables an administrator 260 to review and modify a remote server capture configuration 256, for example to configure the CDC process manager with capture parameters.

As described above, in accordance with an embodiment, the capture process can use this information to make the connection to the remote server, and start receiving the transaction log data from the server, irrespective of where the server is located. Once the capture process starts reading the transaction log data from the remote server, this data can then be processed in a similar manner as a local capture, including, for example, outputting the transaction log data to a canonical format output.

FIG. 15 illustrates an example user interface that enables configuration of a change data capture system to enable heterogeneous database replication from a remote server, in accordance with an embodiment.

As illustrated in FIG. 15, in accordance with an embodiment, the graphical user interface can enable an administrator to review and modify capture parameters such as, for example, cluster details, including cluster endpoints, reader endpoints, or network-accessible ports.

FIG. 16 further illustrates an example user interface that enables configuration of a change data capture system to enable heterogeneous database replication from a remote server, in accordance with an embodiment.

As illustrated in FIG. 16, in accordance with an embodiment, the graphical user interface can also enable an administrator to review and modify capture parameters such as, for example, transaction log formats, or other characteristics of the transaction log.

The above examples of a user interface and user thereof are provided by way of example, and in accordance with an embodiment, to illustrate various interfaces by which an administrator can review and modify a remote server capture configuration, for example to configure the CDC process manager with capture parameters; in accordance with other embodiments, other types of user interfaces can be provided.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although many of the features and techniques described herein are illustrated using the example of capturing data from a MySQL database environment; in accordance with various embodiments, the features and techniques can be similarly used to capture data from other types of distributed data source systems, databases, data structures, or data streams.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for heterogeneous database replication from a remote server, comprising:
    a computer including a processor, and change data system operating thereon that enables replicating of data between database servers;
    wherein a capture component, operable to access records at a database via a network connection and perform a capture process, which is registered to the remote server, wherein the database is associated with the remote server, and wherein the remote server is associated with connection parameters that enable the capture process to connect to the remote server and to receive transaction log events that are indicative of database transactions to modify data at the database associated with the remote server;
    wherein the capture process is configured to appear and operate as a replication slave to the remote server, including use of a process for:
        determining a slave server identifier that enables operation with the remote server, and
        determining a log positioning information, including a start position, which information is provided to the remote server for use by the remote server in sending transaction log data beginning from the start position; and
    wherein as the data at the database associated with the remote server is modified, the capture process continues to request transaction log events from the remote server indicative of the database transactions to modify the data at the database associated with the remote server, which transaction log events are processed by the capture process operating as the replication slave to the remote server, and output as change data, in a canonical format output for use by a delivery process in applying the change data to one or more target database server or other systems.

2. The system of claim 1,
    wherein the capture process is registered to operate as a replication slave to the remote server; and
    wherein the capture process uses a method to be registered as the replication slave to the remote server, and to receive information from that server, including transaction event data.

3. The system of claim 1, wherein the environment is a change data capture system, and wherein the transaction log events are written to an output or trail file for use by the change data capture system with the target database server.

4. The system of claim 3, wherein the change data capture system is provided at a different computer or on a different network from the remote server.

5. The system of claim 1, wherein the remote server is provided within an access-restricted or cloud environment.

6. The system of claim 1, wherein the remote server is a MySQL server.

7. The system of claim 1, wherein the capture component includes one or more access thread and reader thread for accessing the records at the database via the network connection,
wherein as the data at the database associated with the remote server is modified, the capture process requests the transaction log events from the remote server indicative of the database transactions to modify the data at the database associated with the remote server, which transaction log events are processed as the change data for use by the delivery process.

8. The system of claim 1, wherein one or more delivery processes are used to convert the change data that is read from the database of a first type, for consumption by a plurality of heterogeneous targets, including at least one of a second type of target server and/or a third type of target server, by forming commands or queries according to each particular target, and applying the commands or queries to that target.

9. A method for heterogeneous database replication from a remote server, comprising:
providing, at a computer including a processor, a change data system operating thereon that enables replicating of data between database servers and a capture component, operable to access records at a database via a network connection and perform a capture process, wherein the database is associated with the remote server, and wherein the capture process is:
registered to a remote server, wherein the remote server is associated with connection parameters that enable the capture process to connect to the remote server and
configured to receive transaction log events that are indicative of database transactions to modify data at the database associated with the remote server;
wherein the capture process is configured to appear and operate as a replication slave to the remote server, including use of a process for:
determining a slave server identifier that enables operation with the remote server, and
determining a log positioning information, including a start position, which information is provided to the remote server for use by the remote server in sending transaction log data beginning from the start position; and
wherein as the data at the database associated with the remote server is modified, the capture process continues to request transaction log events from the remote server indicative of the database transactions to modify the data at the database associated with the remote server, which transaction log events are processed by the capture process operating as the replication slave to the remote server, and output as change data, in a canonical format output for use by a delivery process in applying the change data to one or more target database server or other systems.

10. The method of claim 9,
wherein the capture process is registered to operate as a replication slave to the remote server; and
wherein the capture process uses a method to be registered as the replication slave to the remote server, and to receive information from that server, including transaction event data.

11. The method of claim 9, wherein the environment is a change data capture system, and wherein the transaction log events are written to an output or trail file for use by the change data capture system with the target database server.

12. The method of claim 11, wherein the change data capture system is provided at a different computer or on a different network from the remote server.

13. The method of claim 9, wherein the remote server is provided within an access-restricted or cloud environment.

14. The method of claim 9, wherein the remote server is a MySQL server.

15. A non-transitory computer readable storage medium, including instructions stored thereon which when read and executed by one or more computers cause the one or more computers to perform a method comprising:
providing a change data system that enables replicating of data between database servers and a capture component, operable to access records at a database via a network connection and perform a capture process, wherein the database is associated with the remote server, and wherein the capture process is:
registered to a remote server, wherein the remote server is associated with connection parameters that enable the capture process to connect to the remote server and
configured to receive transaction log events that are indicative of database transactions to modify data at the database associated with the remote server;
wherein the capture process is configured to appear and operate as a replication slave to the remote server, including use of a process for:
determining a slave server identifier that enables operation with the remote server, and
determining a log positioning information, including a start position, which information is provided to the remote server for use by the remote server in sending transaction log data beginning from the start position; and
wherein as the data at the database associated with the remote server is modified, the capture process continues to request transaction log events from the remote server indicative of the database transactions to modify the data at the database associated with the remote server, which transaction log events are processed by the capture process operating as the replication slave to the remote server, and output as change data, in a canonical format output for use by a delivery process in applying the change data to one or more target database server or other systems.

16. The non-transitory computer readable storage medium of claim 15,
wherein the capture process is registered to operate as a replication slave to the remote server; and
wherein the capture process uses a method to be registered as the replication slave to the remote server, and to receive information from that server, including transaction event data.

17. The non-transitory computer readable storage medium of claim 15, wherein the environment is a change data capture system, and wherein the transaction log events are written to an output or trail file for use by the change data capture system with the target database server.

18. The non-transitory computer readable storage medium of claim 17, wherein the change data capture system is provided at a different computer or on a different network from the remote server.

19. The non-transitory computer readable storage medium of claim 15, wherein the remote server is provided within an access-restricted or cloud environment.

20. The non-transitory computer readable storage medium of claim 15, wherein the remote server is a MySQL server.

* * * * *